US012599522B2

(12) United States Patent
Bhimavarapu et al.

(10) Patent No.: US 12,599,522 B2
(45) Date of Patent: Apr. 14, 2026

(54) PATIENT SUPPORT APPARATUSES WITH WIRELESS HEADWALL COMMUNICATION

(71) Applicant: Stryker Corporation, Kalamazoo, MI (US)

(72) Inventors: Krishna Sandeep Bhimavarapu, Kalamazoo, MI (US); Annie Désaulniers, Bothell, WA (US); Michael Joseph Hayes, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 11 days.

(21) Appl. No.: 18/375,228

(22) Filed: Sep. 29, 2023

(65) Prior Publication Data

US 2024/0024177 A1 Jan. 25, 2024

Related U.S. Application Data

(63) Continuation of application No. 17/582,792, filed on Jan. 24, 2022, now Pat. No. 11,801,181, which is a continuation of application No. 17/158,716, filed on Jan. 26, 2021, now Pat. No. 11,229,564, which is a continuation of application No. 16/131,428, filed on Sep. 14, 2018, now Pat. No. 10,918,545, which is a
(Continued)

(51) Int. Cl.
*A61G 7/05* (2006.01)
*A61G 7/018* (2006.01)
*H04B 7/24* (2006.01)

(52) U.S. Cl.
CPC ............... *A61G 7/05* (2013.01); *A61G 7/018* (2013.01); *H04B 7/24* (2013.01)

(58) Field of Classification Search
CPC ........ G08B 21/00; G08B 21/02; G08B 21/22; G06Q 50/00; G06Q 50/22; G06Q 50/24; A61B 5/00; A61B 5/01; A61B 5/1117
See application file for complete search history.

(56) References Cited

U.S. PATENT DOCUMENTS 9,830,424 B2 * 11/2017 Dixon ..................... H04W 4/33
2008/0224861 A1 * 9/2008 McNeely .............. H04L 5/1461
340/540
(Continued)

*Primary Examiner* — Van T Trieu
(74) *Attorney, Agent, or Firm* — Gardner, Linn, Burkhart & Ondersma LLP

(57) ABSTRACT

A person support apparatus includes a first transceiver adapted to wirelessly communicate with a second transceiver of a headwall interface that is positioned off of the person support apparatus. A communication link is automatically established between the first and second transceivers without requiring a user of the person support apparatus to activate a designated control and without requiring the user to identify the headwall interface. The first transceiver includes a unique identifier assigned to the headwall interface in its messages to the headwall interface. The first transceiver may also automatically transmit a disconnect signal to the headwall interface indicating the termination of the communication link is not accidental. The disconnect signal is sent based on one or more of the following: (1) a brake being off, (2) an A/C power cord being unplugged; and/or (3) a signal strength between the transceivers decreasing.

18 Claims, 10 Drawing Sheets

Related U.S. Application Data continuation of application No. 14/819,844, filed on Aug. 6, 2015, now Pat. No. 10,085,905.

(60) Provisional application No. 62/035,656, filed on Aug. 11, 2014.

(56) References Cited

U.S. PATENT DOCUMENTS

| | | | |
|---|---|---|---|
| 2015/0035677 A1* | 2/2015 | Williams | G01J 5/0025 |
| | | | 340/573.1 |
| 2016/0038361 A1* | 2/2016 | Bhimavarapu | H04B 10/1149 |

* cited by examiner

PATIENT SUPPORT APPARATUSES WITH WIRELESS HEADWALL COMMUNICATION

CROSS-REFERENCE TO RELATED APPLICATIONS

This application is a continuation of U.S. patent application Ser. No. 17/582,792 filed Jan. 24, 2022, by inventors Krishna Bhimavarapu et al. and entitled PATIENT SUPPORT APPARATUSES WITH HEADWALL COMMUNICATION, which is a continuation of U.S. patent application Ser. No. 17/158,716 filed Jan. 26, 2021, by inventors Krishna Bhimavarapu et al. and entitled PATIENT SUPPORT APPARATUSES WITH WIRELESS HEADWALL COMMUNICATION, which is a continuation of U.S. patent application Ser. No. 16/131,428 filed Sep. 14, 2018, by inventors Krishna Bhimavarapu et al. and entitled PATIENT SUPPORT APPARATUSES WITH WIRELESS HEADWALL COMMUNICATION, which in turn is a continuation of U.S. patent application Ser. No. 14/819,844 filed Aug. 6, 2015, by inventors Krishna Bhimavarapu et al. and entitled PATIENT SUPPORT APPARATUSES WITH WIRELESS HEADWALL COMMUNICATION, which in turn claims priority to U.S. provisional patent application Ser. No. 62/035,656 filed Aug. 11, 2014 by inventors Krishna S. Bhimavarapu et al. and entitled PATIENT SUPPORT APPARATUSES WITH WIRELESS HEADWALL COMMUNICATION, the complete disclosures of all of which are hereby incorporated herein by reference.

BACKGROUND

The present disclosure relates to medical facilities having headwalls with one or more connectors that enable communication between a nurse call system and one or more medical devices, such as person support apparatuses (e.g. beds, stretchers, cots, recliners, etc.).

Medical facilities, such as hospitals, typically include a headwall having one or more outlets and/or other types of connectors into which the plugs of cables connected to medical devices can be inserted. For example, headwalls will typically include at least one outlet that interfaces with a nurse-call system and which is designed to accept a cable from a hospital bed, or from a hand-held pendant positioned on the bed. When the cable is plugged into this outlet, a patient positioned on the bed is able to press a button to summon a nurse and/or to communicate aurally with the nurse.

Existing headwall connectors also typically communicate with one or more environmental controls, such as one or more controls for in-room televisions, room lights, and/or electrically movable curtains. When the appropriate device and its associated cable is plugged into the headwall connector from a bed, pendant, or other device, a person is able to control the environmental control via the device (e.g. bed, pendant, or other device). Thus, for example, a patient positioned on a bed is able to control the volume of a television in the room via controls on the bed due to the proper cable being connected from the bed to the headwall. In some instances, a single cable is plugged into a single connector on the headwall and used for communicating both with the nurse call system of the medical facility, and for communicating with the one or more environmental controls. In such instances, the headwall connector forwards the environmental control signals it receives to the appropriate environmental control unit, and forwards the nurse call signals it receives to the appropriate component of the nurse call system.

SUMMARY

A person support apparatus is provided that includes circuitry for wirelessly communicating with a headwall connector of a medical facility. In some embodiments, the wireless circuitry automatically establishes communication with the correct connector of the headwall without requiring any user actions. In other embodiments, the wireless circuitry automatically disestablishes communication with the connector of the headwall without triggering a "cord out" alert or other type of disconnection alert and also without requiring the user to take any action to avoid triggering the cord out alert. In some embodiments, the wireless circuitry is adapted to automatically select one and only one headwall interface and one and only one connector to wirelessly communicate with based upon the current location of the person support apparatus. In other embodiments, the wireless circuitry is adapted to notify a caregiver if it has not been able to establish a wireless connection. Still further, in other embodiments, the wireless circuitry is adapted to notify a caregiver if the communication link between the wireless circuitry and the headwall interface is unintentionally lost or disrupted. In still other embodiments, two or more of these features are combined in a single person support apparatus.

In the various embodiments, the number of actions required by a caregiver to establish communication with the correct headwall interface, as well as to intentionally disestablish such communication (without triggering an alert) is reduced. Other aspects, such as easy-to-recognize visual indications of the communication status of the person support apparatus vis-a-vis the headwall interface may also be included. Still further, in some embodiments, multiple person support apparatuses may be configured to communicate wirelessly with the same headwall interface, either each directly, or with one acting as a communication intermediary for the other(s).

According to one embodiment, a person support apparatus is provided that includes a support surface, a first transceiver, and a controller. The support surface is adapted to support a person. The first transceiver wirelessly communicates with a headwall interface positioned off of the person support apparatus. The controller automatically establishes a communication link between the first transceiver and the headwall interface without requiring a user of the person support apparatus to activate a control designated for establishing the communication link and without requiring the user to identify the headwall interface.

According to other aspects, the first transceiver is able to wirelessly transmit signals to a plurality of headwall interfaces positioned off of the person support apparatus and the controller is adapted to automatically select one of the plurality of headwall interfaces that is in the same immediate location as the person support apparatus to establish the communication link with.

In still other embodiments, the person support apparatus includes a second transceiver adapted to wirelessly receive location information from a locator, wherein the locator is positioned off of the person support apparatus and at a fixed location, and wherein the location information relates to the position of the person support apparatus within a healthcare facility.

The person support apparatus may also include an additional transceiver that is adapted to wirelessly communicate with the headwall interface. When so included, a microphone is also included on the person support apparatus and the controller is adapted to transmit audio signals generated from the microphone to the headwall interface using the additional transceiver. The additional transceiver uses a communications protocol that is different from the first transceiver.

In other embodiments, the person support apparatus further includes a room environmental control in communication with the controller, wherein the controller is adapted to transmit a room environmental control signal to the headwall interface using the first transceiver in response to the user of the person support apparatus activating the room environmental control. The room environmental control may be adapted to control one or more aspects of a television, light, curtain, thermostat, or other features of the room in which the person support apparatus is located.

The person support apparatus may further include a base on which the support surface is supported; a plurality of wheels supported on the base; a brake adapted to brake and unbrake the plurality of wheels; and a brake sensor adapted to determine a status of the brake. The brake sensor communicates with the controller and the controller bases its communications with the headwall interface at least partially upon the status of the brake sensor.

The person support apparatus may also include a light positioned adjacent a head end of the person support apparatus and in communication with the controller. The light has a first illumination state prior to the establishment of the communication link between the first transceiver and the headwall interface and a second illumination state after the establishment of the communication link. The person support apparatus may be a bed having a headboard, a footboard, and a plurality of side rails. When the person support apparatus is a bed, the light is positioned on the headboard in one embodiment.

The controller may further be adapted to issue an alert when it is unable to establish the communication link a predetermined amount of time after initially attempting to establish the communication link.

In at least one embodiment, the controller establishes the communication link between the first transceiver and the headwall interface by sending a signal to the headwall interface that includes an identifier that is specific to the headwall interface.

According to another embodiment, a person support apparatus system is provided that includes a person support apparatus adapted to support a person, a first transceiver, a plurality of headwall interfaces, and a controller. The first transceiver is coupled to the person support apparatus. The plurality of headwall interfaces each include a second transceiver adapted to wirelessly communicate with the first transceiver, and each of the headwall interfaces has a unique identifier. The controller is coupled to the person support apparatus and adapted to establish a communication link with a specific one (and only one) of the headwall interfaces by sending a signal to that specific headwall interface that includes the unique identifier for that specific headwall interface.

In other embodiments, the person support apparatus includes a third transceiver coupled to the person support apparatus that is adapted to receive the unique identifier and forward the unique identifier to the controller. The person support apparatus system may further include a locator that is positioned at a fixed location off of the person support apparatus and that is adapted to wirelessly transmit the unique identifier to the third transceiver.

The controller, in at least one embodiment, transmits to the specific headwall interface first signals for forwarding to a nurse call system and second signals for controlling a feature of an environment in which the person support apparatus is positioned.

In other embodiments, the controller is adapted to transmit a disconnect signal from the first transceiver to the specific headwall interface, wherein the disconnect signal indicates that a cord-out alert of a nurse call system should not be activated. The disconnect signal may be based at least partially upon information from a brake sensor adapted to determine a status of a brake on the person support apparatus. The disconnect signal may also or alternatively be based at least partially upon the status of an A/C power cord of the person support apparatus relative to an A/C wall outlet (i.e. whether the cord is plugged into the A/C outlet or not). The disconnect signal may also or alternatively be based at least partially upon a determination of whether the signal strength in the communication link between the wireless circuitry of the person support apparatus and the specific headwall interface has changed, or is changing.

In other embodiments, the controller is adapted to establish the communication link between wireless circuitry of the person support apparatus and the specific headwall interface regardless of whether or not the person support apparatus is connected to an A/C power outlet.

In still other embodiments, the person support apparatus includes a light positioned adjacent its head end that is in communication with the controller. The light has a first illumination state prior to the establishment of the communication link with the specific headwall interface and a second illumination state after the establishment of the communication link with the specific headwall interface.

The controller, in some embodiments, automatically attempts to establish the communication link in response to the A/C power cord on the person support apparatus being plugged into an A/C power outlet. In other embodiments, the controller automatically attempts to establish the communication link in response to a brake on the person support apparatus being activated. In still other embodiments, the controller automatically attempts to establish the communication link in response to communication with a locator unit. In still other embodiments, the controller automatically attempts to establish the communication link in response to any combination of two or more of these criteria, or still other criteria.

According to another embodiment, a person support apparatus is provided that includes a support surface adapted to support a person, a transceiver, and a controller. The transceiver is adapted to wirelessly communicate with a headwall interface positioned off of the person support apparatus and the controller is adapted to automatically send a communication link disconnect signal from the transceiver to the headwall interface without requiring a user of the person support apparatus to activate a control designated for disconnecting the communication link.

The headwall interface, after receiving the disconnect signal, may communicate information to a nurse call system indicating that the person support apparatus has intentionally disconnected itself from communicating with the nurse call system, thereby allowing the nurse call system to avoid issuing a disconnect alert.

The disconnect signal may be based at least partially upon any one or more of the following: the status of a brake sensor on the person support apparatus, the status of an A/C power cable on the person support apparatus, and the signal strength of the communications between the person support apparatus and the headwall interface.

According to another embodiment, a person support apparatus system is provided that includes a person support apparatus having a support surface adapted to support a person, a first transceiver coupled to the person support apparatus, and a headwall interface having a second transceiver. The first and second transceivers are adapted to wirelessly communicate with each other. The headwall interface further includes a third transceiver adapted to wirelessly communicate with a local area network positioned within a facility in which the person support apparatus is located. The headwall interface is adapted to forward data received from the local area network via the third transceiver using the second transceiver to the person support apparatus.

In some embodiments, the data received from the local area network includes an update for software executed by at least one controller positioned on the person support apparatus.

In still other embodiments, the support apparatus system includes a fourth transceiver positioned on the person support apparatus and adapted to wirelessly receive location information from a locator, wherein the locator is positioned off of the person support apparatus and at a fixed location, and wherein the location information relates to the position of the person support apparatus within a healthcare facility. The first, second, and third transceivers are radio frequency transceivers, and the fourth transceiver is an optical transceiver, such as an infrared transceiver, in at least some embodiments.

The third transceiver communicates using a protocol that follows any 802 standard of the Institute of Electrical and Electronics Engineers (IEEE), such as, but not limited to, 802.11 (WiFi), 802.15.1 (Bluetooth), and/or 802.15.4 (Zig-Bee).

In any of the embodiments, the person support apparatus may be a bed, recliner, cot, stretcher, operating table, or other type of structure adapted to support a person.

Before the various embodiments disclose herein are explained in detail, it is to be understood that the claims are not to be limited to the details of operation or to the details of construction and the arrangement of the components set forth in the following description or illustrated in the drawings. The embodiments described herein are capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the claims to any specific order or number of components. Nor should the use of enumeration be construed as excluding from the scope of the claims any additional steps or components that might be combined with or into the enumerated steps or components.

DETAILED DESCRIPTION OF THE EMBODIMENTS

Figure 1:
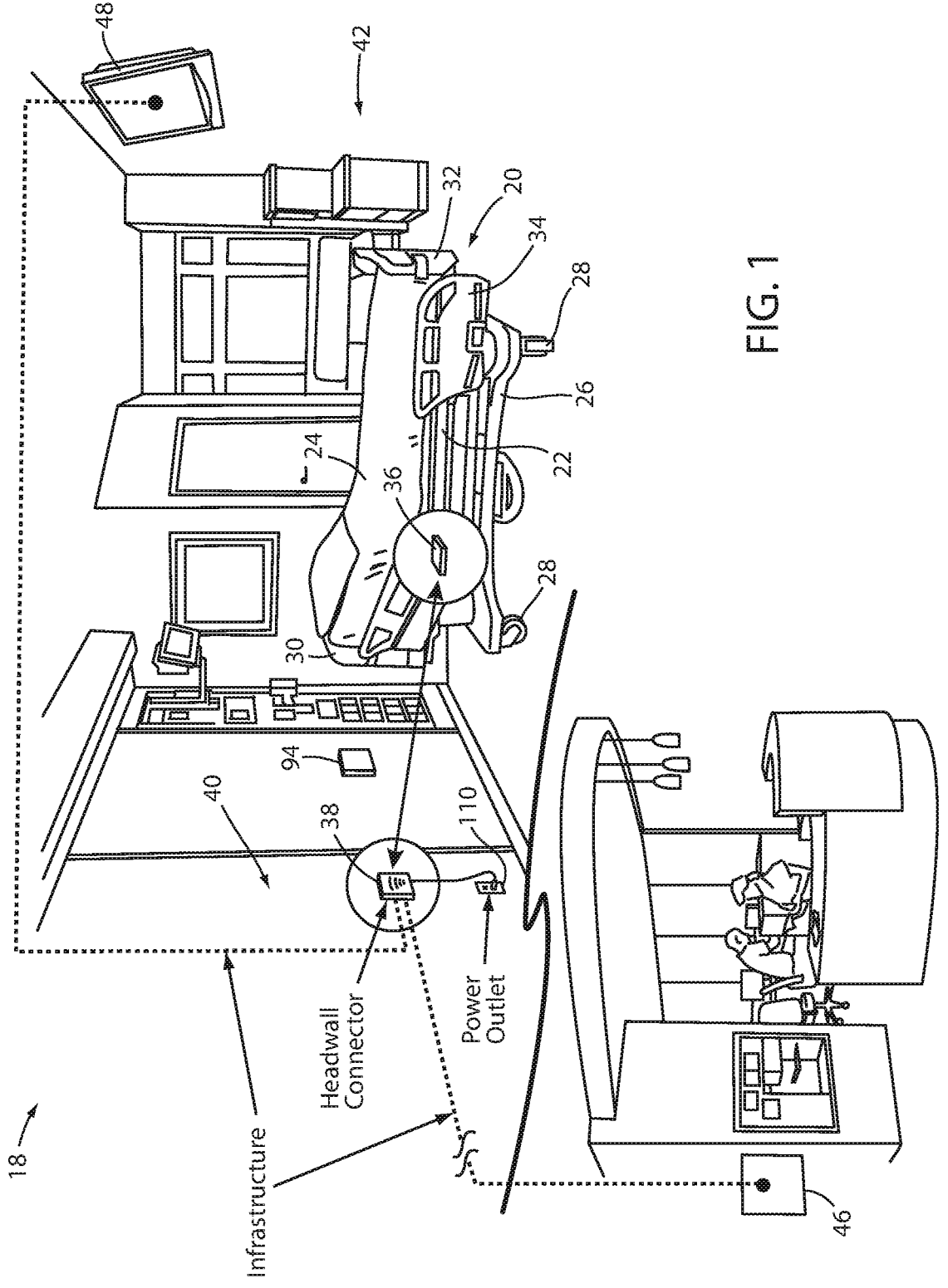
FIG. 1 is a perspective view of person support apparatus system according to a first embodiment of the disclosure.

An illustrative layout of a person support apparatus system 18 is shown in FIG. 1 according to one embodiment. Person support apparatus system 18 includes a person support apparatus 20 having a mobile wireless unit 36 and a headwall interface 38. For purposes of visual description herein, person support apparatus 20 is shown in the accompanying drawings as a hospital bed, but it will be understood that person support apparatus 20 can be alternatively implemented as a cot, stretcher, chair, recliner, operating table, or other apparatus that is capable of supporting a person. Person support apparatus 20 of FIG. 1 includes a support surface 22 on which a mattress 24 is positioned to allow a person to lie or sit thereon. Person support apparatus 20 further includes a base 26 having a plurality of wheels 28 that allow person support apparatus 20 to be moved to different locations. Still further, person support apparatus 20 of FIG. 1 includes a headboard 30, a footboard 32, and a plurality of siderails 34.

The construction of person support apparatus 20 may take on a wide variety of different forms. In some embodiments, other than the components described below, person support apparatus 20 is constructed in any of the manners described in commonly assigned, U.S. Pat. No. 8,689,376 issued Apr. 8, 2014 by inventors David Becker et al. and entitled PATIENT HANDLING DEVICE INCLUDING LOCAL STATUS INDICATION, ONE-TOUCH FOWLER ANGLE ADJUSTMENT, AND POWER-ON ALARM CONFIGURATION, the complete disclosure of which is hereby incorporated herein by reference. In other embodiments, those components of person support apparatus 20 not described below are constructed in any of the manners described in commonly assigned, U.S. patent application Ser. No. 13/775,285 filed Feb. 25, 2013 by inventors Guy Lemire et al. and entitled HOSPITAL BED, the complete disclosure of which is also hereby incorporated herein by reference. Still further, in other embodiments, those components of person support apparatus 20 not described below are constructed in any of the manners disclosed in commonly assigned, U.S. patent application Ser. No. 14/212,009 filed Mar. 14, 2014 by inventors Christopher Hough et al., and entitled MEDI-CAL SUPPORT APPARATUS. In still other embodiments, person support apparatus 20 takes on other constructions.

As shown in FIG. 1, the mobile wireless unit 36 is adapted to wirelessly communicate with the headwall interface 38 mounted to a headwall 40 of a room 42. Headwall interface 38 is adapted to communicate with a conventional headwall connector 44 that is integrated into headwall 40. Headwall connector 44, in turn, is adapted to communicate with both a conventional nurse call system 46 and a conventional room environmental control 48. As will be discussed in greater detail below, mobile wireless unit 36 and headwall interface 38 are adapted to establish a communication link that allows person support apparatus 20 to communicate with the conventional nurse call system 46 and/or the conventional room environmental control 48 without the need, such as in prior systems, to connect a cable between person support apparatus 20 and headwall connector 44. This relieves a caregiver of a patient supported on person support apparatus 20 of the need to make this manual wired connection, thereby reducing the labor of the caregiver. This also relieves the caregiver of the need to manually disconnect the wired cable—that would otherwise be necessary—when moving the person support apparatus 20 to a new location. Still further, this reduces the physical clutter within the vicinity of person support apparatus 20.

Figure 2:
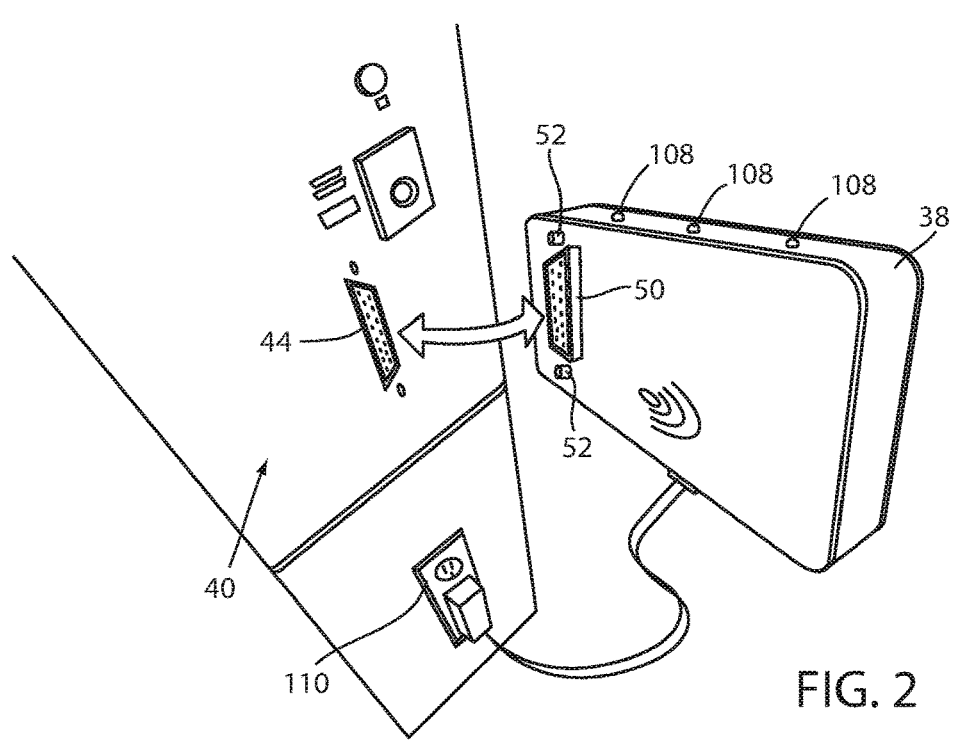
FIG. 2 is a perspective view of a headwall interface of the person support apparatus system and a first type of headwall connector.

FIG. 2 illustrates headwall interface 38 in more detail. Headwall interface 38 includes an integral plug 50 that is adapted to be inserted into headwall connector 44, which is typically a conventional headwall connector that exists within a medical facility for making electrical connections to the existing nurse call system 46 and/or environmental controls 48. Headwall connector 44 is a receptacle that is dimensioned and shaped to selectively frictionally retain plug 50, as well as the entire headwall interface 38, therein. One or more mounting screws 52 may be included with plug 50 in order to more securely retain headwall interface 38 to connector 44, if desired.

In the embodiment shown in FIG. 2, plug 50 is a 37 pin connector that includes 37 pins adapted to be inserted into 37 mating sockets of headwall connector 44. Such 37 pin connections are one of the most common types of connectors found on existing headwalls of medical facilities for making connections to the nurse call system 46 and/or the environmental controls 48. Headwall interface 38 of FIG. 2 is therefore configured to mate with one of the most common type of headwall connectors 44 used in medical facilities. Such 37 pin connectors, however, are not the only type of connectors, and it will be understood that headwall interface 38 can be adapted to electrically couple to different types of headwall connectors 44.

Figure 3:
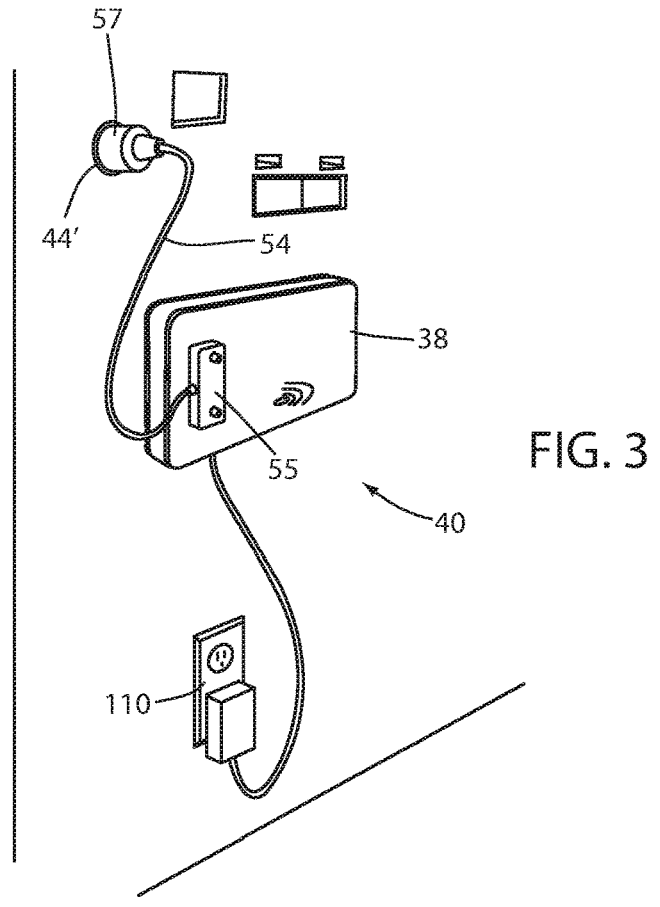
FIG. 3 is a perspective view of the headwall interface of FIG. 2 and an adapter cable for coupling the headwall interface to a second type of headwall connector.

For example, FIG. 3 illustrates headwall interface 38 coupled to an alternative type of headwall connector 44' using an adapter cable 54. Adapter cable 54 includes a receptacle 55 at one end that has 37 sockets that are adapted to mate with the 37 pins of plug 50 of headwall interface 38. Adapter cable 54 includes a plug 57 at its opposite end that is adapted to electrically and physically couple to headwall connector 44'. Adapter cable 54 therefore electrically couples the 37 pin connection of plug 50 to a headwall connector, such as headwall connector 44', that does not have 37 pins and/or that is shaped and/or dimensioned to receive plugs of a different kind than plug 50 included on the body of headwall interface 38. Headwall connector 44', like headwall connector 44, communicates with nurse call system 46 and/or environmental control(s) 48.

Although only one type of adapter cable 54 has been illustrated herein (FIG. 3), it will be understood that additional types of adapter cables 54 may be provided that enable headwall interface 38 to communicatively couple to whatever type of headwall connector 44 that is present in a given healthcare facility or a particular room of a given healthcare facility. As is known to a person of skill in the art, there are many more types of connectors currently in use than the two illustrated in FIGS. 2 and 3, and any appropriate cables, adapters, or other devices may be used to enable the plug 50 of headwall interface 38 to couple to connector 44. It will also be understood that headwall interface 38 can be modified to include one or more plugs that are different than the 37 pin plug 50 shown in FIGS. 2 and 3. As but one example, headwall interface 38 can be modified to include a plug that couples directly to the headwall connector 44' of FIG. 3, and that uses an adapter cable to couple to the 37 pin connector 44 of FIG. 2. Many other variations are also, of course, possible.

Regardless of the physical form factor of the headwall connector 44, headwall interface 38 is adapted to wirelessly receive signals from person support apparatus 20 and deliver the signals to headwall connector 44 in a manner that matches the way the signals would otherwise be delivered to headwall connector 44 were a conventional cable connected between person support apparatus 20 and headwall connector 44. In other words, mobile wireless unit 36 and headwall interface 38 cooperate together to provide signals to headwall connector 44 in a manner that is transparent to connector 44 such that connector 44 is unaware of whether it is communicatively coupled directly to person support apparatus via a cable, or whether it is communicatively coupled to person support apparatus 20 via the combination of headwall interface 38 and mobile wireless unit 36. In this manner, a healthcare facility can utilize the wireless communication abilities of one or more person support apparatuses 20 without having to make any changes to their existing headwall connectors 44 (or to their nurse call system 46 or environmental controls 48). Use of this wireless communication ability merely requires mobile wireless unit 36, headwall interface 38, and, if necessary, an adapter cable 54 coupled between the headwall interface 38 and the headwall connector 44.

In at least one embodiment, in addition to sending signals received from mobile wireless unit 36 of person support apparatus 20 to headwall connector 44, headwall interface 38 is also adapted to forward signals received from headwall connector 44 to mobile wireless unit 36 of person support apparatus 20. Headwall interface 38 is therefore adapted, in at least one embodiment, to provide bidirectional communication between person support apparatus 20 and headwall connector 44. Such bidirectional communication includes, but is not limited to, communicating audio signals between a person supported on person support apparatus 20 and a caregiver positioned remotely from person support apparatus 20 (which is accomplished by headwall interface 38 forwarding the audio signals of the person on person support apparatus 20 to nurse call system 46, and vice versa).

Headwall interface 38 communicates the data and signals it receives from mobile wireless unit 36 to connector 44 by directing the incoming data and signals it receives to the appropriate pin or pins of headwall connector 44. For example, when headwall connector 44 includes 37 sockets for coupling to a 37 pin plug, it is common for pins #30 and #31 of connector 44 to be used for indicating a "priority alert," which is often synonymous with an alert that is issued when a patient exits from person support apparatus 20. Further, depending upon the particular configuration that has been implemented at a particular healthcare facility, the connection between pins #30 and #31 may be normally open or it may be normally closed. Regardless of whether it is normally open or normally closed, whenever headwall interface 38 receives a message from mobile wireless unit 36 that a person has exited from person support apparatus headwall interface 38 will change the status of pins #30 and #31 such that they switch from whatever state they are normally in to their opposite state. Headwall interface 38 therefore reacts to the exit message it receives from mobile wireless unit 36 by either opening or closing pins #30 and #31. The nurse call system 46 that is communicatively coupled to headwall connector 44 interprets this opening or closing of pins #30 and #31 in the same manner as if a cable were coupled between headwall connector 44, such as by sending the appropriate signals to one or more nurse's stations, flashing a light outside the room of person support apparatus 20, forwarding a call to a mobile communication device carried by the caregiver assigned to the occupant of person support apparatus 20, and/or taking other steps, depending upon the specific configuration of the nurse call system.

In addition to sending data indicating that an occupant of person support apparatus 20 has exited, or is about to exit, from support surface 22, mobile wireless unit 36 is configured, in at least one embodiment, to wirelessly send to headwall interface 38 at least the following additional messages: messages to turn on or off one or more room lights; messages to turn on or off one or more reading lights; messages to increase or decrease the volume of a nearby television set; messages to change a channel of the nearby television set; and messages containing audio packets generated from one or more microphones on the person support apparatus 20 into which an occupant of person support apparatus 20 speaks when desiring to communicate with a remote caregiver. In other embodiments, mobile wireless unit 36 is configured to wirelessly send to headwall interface 38 any one or more of the following messages, either in addition to or in lieu of any one or more of the messages just mentioned: messages indicating the current status of one or more siderails 34 of person support apparatus 20 (e.g. whether the side rails are up or down, or have changed position); messages indicating the current status of a brake on person support apparatus 20; messages indicating the current status of the height of support surface 22 relative to base 26 (e.g. such as whether support surface 22 is at its lowest height or not); messages indicating the current angle of a head section of support surface 22 that is adapted to support a patient's torso and head; messages indicating the current status of an exit detection system (e.g. whether the exit detection system is armed or not); messages indicating the current charging status of one or more batteries on person support apparatus 20; messages indicating the current status of an alternating current (A/C) power cable on person support apparatus 20 (e.g. whether it is plugged in or not); diagnostic information about person support apparatus 20; and/or any other messages containing information about person support apparatus 20 which may be useful to communicate to a remote location.

In at least one embodiment, headwall interface 38 is further configured to transmit information to headwall connector that does not originate from person support apparatus 20, but instead is generated internally within headwall interface 38. For example, in one embodiment, headwall interface 38 is adapted to forward to headwall connector 44 a signal that indicates a "cord out" alert whenever the communication link between headwall interface 38 and mobile wireless unit 36 is unintentionally lost. In many instances, when a conventional cable is coupled between headwall connector 44 and a hospital bed, and the cable is inadvertently disconnected, the electrical status of pins 10 and 11 (in a conventional 37 pin connection) will be changed such that the nurse call system will recognize that the cable has become disconnected, and will therefore issue an appropriate alert to the appropriate personnel. Headwall interface 38 is configured to make the same changes to pins 10 and 11 when it unintentionally loses communication with mobile wireless unit 36 that would be made to pins 10 and 11 if a cable connection between person support apparatus 20 and connector 44 has become unintentionally disconnected. Thus, headwall interface 38 and mobile wireless unit 36 together include the same ability to provide an indication to headwall connector 44 of an unintentional disconnection that exists in some currently-available cable connections to headwall connectors. Still other types of signals that originate from within headwall interface 38 may also be sent to headwall connector 44 in addition to, or in lieu of, this cord out alert.

In addition to forwarding any of the above-described messages or signals to headwall connector 44, headwall interface 38 is also adapted, in at least one embodiment, to forward the following messages to wireless unit 36 based on information it receives from headwall connector 44: messages indicating the establishment and disestablishment of a nurse-call communication link (e.g. messages used for turning on and off a "nurse answer" light on person support apparatus 20); and messages containing audio packets of a caregiver's voice (generated from a microphone into which the caregiver speaks and forwarded to the appropriate pins of connector 44).

In other embodiments, one or more additional messages are also transmitted to mobile wireless unit 36 that originate from within headwall interface 38, rather than from connector 44. Such messages include any one or more of the following: the charge status of a battery 114 (FIG. 4) contained within headwall interface 38; acknowledgements of messages transmitted from mobile wireless unit 36 to headwall interface 38; and messages used to establish, maintain, and disestablish the communication link between mobile wireless unit 36 and headwall interface 38.

Figure 4:
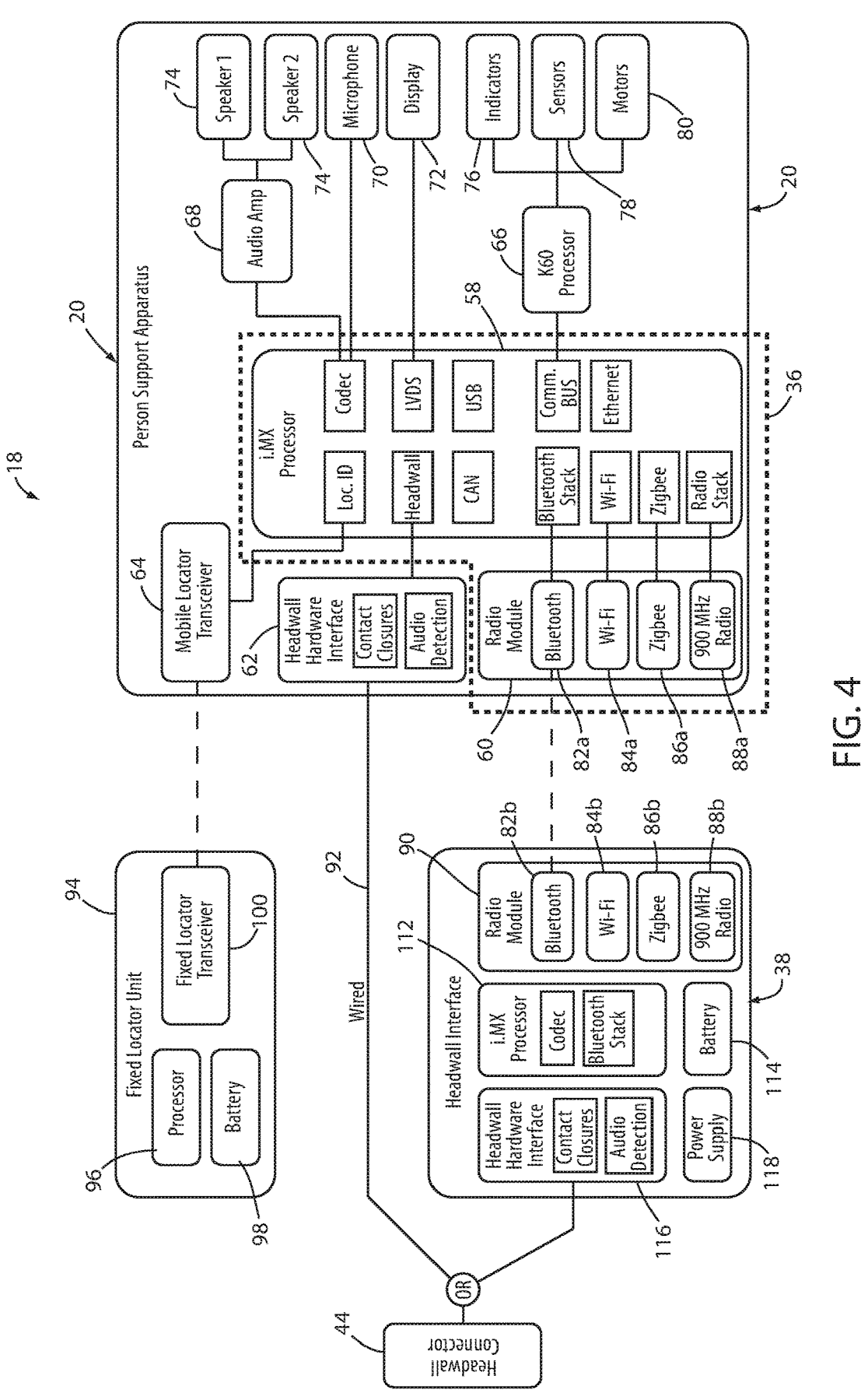
FIG. 4 is a diagram of the internal components of the person support apparatus system of FIG. 1.

One example of the internal components of both mobile wireless unit 36 and headwall interface 38 is shown in FIG. 4. As can be seen, mobile wireless unit 36 includes a controller 58 that is in electrical communication with a radio module 60, as well as a headwall hardware interface 62, a mobile locator transceiver 64, a main person support apparatus controller 66, an audio amplifier 68, a microphone 70, and a display 72. Audio amplifier 68, in turn, is in electrical communication with one or more speakers 74. Controller 58 of mobile wireless unit 36, as well as main controller 66 of person support apparatus 20, may take on a variety of different forms, such as, but not limited to, commercially available off-the-shelf microcontrollers.

For example, in one embodiment, controller 58 is any one of the i.MX family of system-on-chip (SoC) processors, and main controller 66 is any one of the Kinetis K60 family of microcontroller units (MCUs), both of which are marketed by Freescale Semiconductor of Austin, Texas. Other types of commercially available microcontrollers may also be used. Still further, controllers 58 and 66 may take on still other forms, such as any combination of any one or more micro- processors, field programmable gate arrays, systems on a chip, volatile or nonvolatile memory, discrete circuitry, and/or other hardware, software, or firmware that is capable of carrying out the functions described herein, as would be known to one of ordinary skill in the art. Such components can be physically configured in any suitable manner, such as by mounting them to one or more circuit boards, or arrang- ing them in other manners, whether combined into a single unit or distributed across multiple units. The instructions followed by controllers 58 and 66 in carrying out the functions described herein, as well as the data necessary for carrying out these functions, are stored in one or more accessible memories (not shown).

Main controller 66 is responsible for carrying out the overall operations of person support apparatus 20, while controller 58 is responsible for carrying out the communi- cation between person support apparatus 20 and headwall interface 38. In some embodiments, a single controller that combines the functions of main controller 66 and controller 58 is used. In the embodiment shown in FIG. 4, main controller 66 is in communication with one or more indica- tors 76, one or more sensors 78, and one or more motors 80. Indicators 76 may, for example, be any one or more lights, buzzers, displays, or the like that are able to provide an indication in aural or visual form to an occupant of person support apparatus 20, or to a caregiver associated with person support apparatus 20. Sensors 78 include sensors that are adapted to detect parameters of person support apparatus 20, such as, but not limited to, the status of a brake for wheels 28; the presence, absence, and/or movement of an occupant of person support apparatus 20 on support surface 22; the height of support surface 22 relative to base 26; the status (raised or lowered) of one or more siderails 34; the armed or disarmed state of an exit detection system (that detects the presence, absence, and/or movement of the occupant of person support apparatus 20 on support surface 22); and/or other parameters. Motors 80 provide movement to one or more components of person support apparatus 20, such as, but not limited to, raising and lowering the height of support surface 22 relative to base 26, and/or raising and lowering one or more sections of support surface 22. As will be discussed in greater detail below, main controller 66 is adapted to forward information from one or more of sensors 78 to controller 58 of mobile wireless unit 36 for forwarding to headwall interface 38.

Controller 58 of mobile wireless unit 36, in addition to being in communication with main controller 66, is also in communication with audio amplifier 68 for purposes of delivering audio signals to speakers 74. Such audio signals include the audio signals received by mobile wireless unit 36 from headwall interface 38 that correspond to the voice of a caregiver who is speaking from a remote location to an occupant of person support apparatus 20. Further, in some embodiments, controller 58 may send audio signals to audio amplifier 68 and speakers 74 that are received from other sources, such as from a server located on a local area network (not shown) of the healthcare facility in which person support apparatus 20 is positioned.

When an occupant of person support apparatus 20 wishes to speak to a caregiver at a remote location via the facility's nurse call system 46, he or she speaks into microphone 70. Controller 58 digitizes the aural signals and forwards them to headwall interface 38 which, in turn, directs them to the appropriate pin on headwall connector 44 (which thereafter transmits the signals to the caregiver via nurse call system 46).

Mobile wireless unit 36 communicates wirelessly with headwall interface 38 via radio module 60. In the embodi- ment illustrated in FIG. 4, radio module 60 includes four separate transceivers: a Bluetooth transceiver (IEEE 802.15.1) 82a, a WiFi transceiver (IEEE 802.11) 84a, a ZigBee transceiver (IEEE 802.15.4) 86a, and a 900 MHz transceiver 88a. It will be understood that the number of transceivers within radio module 60 can vary from the four shown in FIG. 4, and that the protocols used for the transceivers can take on different forms than those illustrated in FIG. 4. Radio module 60 communicates wirelessly with a radio module 90 contained within headwall interface 38. Radio module 90 includes four transceivers: a Bluetooth transceiver 82b that communicates with Bluetooth trans- ceiver 82a of mobile wireless unit 36; a WiFi transceiver 84b that communicates with WiFi transceiver 84a of mobile wireless unit 36; a ZigBee transceiver 86b that communi- cates with ZigBee transceiver 86a of mobile wireless unit 36; and a 900 MHz transceiver 88b that communicates with 900 MHz transceiver 88a of mobile wireless unit 36. As with radio module 60, radio module 90 can be modified to include a different number of transceivers, as well as one or more transceivers that use different wireless communication pro- tocols from those shown in FIG. 4. Radio modules 60 and 90 communicate the messages previously described (e.g. nurse- call audio signals, exit detection alerts, status of brakes, side rails, etc.). It will be understood that the use of the term "transceiver" herein is intended to cover not only devices that include a transmitter and receiver contained within a single unit, but also devices having a transmitter separate from a receiver, and/or any other devices that are capable of both transmitting and receiving signals or messages.

Mobile wireless unit 36 and headwall interface 38, in at least one embodiment, include radio modules 60 and 90, respectively, that each includes only two transceivers—one of which is used to communicate data between mobile wireless unit 36 and headwall interface 38, and the other of which is used to communicate audio signals. Furthermore, in at least one embodiment, the transceivers used to transmit data are capable of transmitting binary data packets at a rate of at least 10 kilobits per second with a delay of less than 100 milliseconds; and the transceivers used to communicate the audio signals have a bandwidth of at least 8 kilohertz and transmits the audio signals with less than 400 milliseconds of delay. Other bandwidths and delay thresholds can, of course, be used for either or both sets of transceivers.

In the embodiment of person support apparatus system 18 shown in FIG. 4, controller 58 of mobile wireless unit 36 further communicates with headwall hardware interface 62. Headwall hardware interface 62 includes a receptacle (not labeled) for receiving a cable 92 that can be plugged in at its other end to headwall connector 44. Thus, the particular embodiment of person support apparatus 20 that is shown in FIG. 4 is capable of communicating with headwall connec- tor 44 in either a wired or wireless fashion. To communicate in a wired fashion, cable 92 is connected between headwall connector 44 and headwall hardware interface 62. To com- municate in a wireless fashion, headwall interface 38 is plugged into headwall connector 44 instead of cable 92.

In at least one alternative embodiment, headwall interface 38 includes a pass through connector (not shown) that is adapted to receive the end of cable 92 that normally plugs into headwall connector and to seamlessly pass the data and/or audio signals received from cable 92 to plug 50, which fits into headwall connector 44. Similarly, the data and/or audio signals received via plug 50 from headwall connector 44 are seamlessly passed to cable 92. The pass through connector therefore allows a healthcare facility to keep headwall interface 38 affixed to headwall connector 44 at all times and to simply use whichever of the two communication options (wired or wireless) that a particular person support apparatus 20 is capable of without having to remove or install headwall interface 38 for different types of person support apparatuses. In other words, if a particular person support apparatus 20 does not include wireless capability, a user can simply plug cable 92 into the pass through connector of headwall interface 38. On the other hand, if a particular person support apparatus 20 does include wireless capability, a user need not plug anything into headwall interface 38, nor take any other steps to enable the wireless communication because headwall interface 38 is already coupled to connector 44.

In still another embodiment, headwall interface 38 is integrated into the headwall 40 as part of headwall connector 44—either with or without the pass through connector— rather than being a separate unit that a user connects and disconnects from connector 44. In this embodiment, the space on headwall 40 that would otherwise be occupied by headwall interface 38 remains unoccupied, thereby reducing clutter and freeing this space for other uses. When headwall interface 38 is integrated into headwall connector 44, it may also include its own separate and direct connection to the A/C mains line, rather than having a separate power cable that must be plugged into an A/C outlet by personnel, thereby making one more A/C outlet available for powering other devices and reducing the work load involved in using headwall interface 38.

In yet another alternative embodiment, mobile wireless unit 36 is a unit that is physically separate from person support apparatus 20 but is adapted to be selectively plugged into and unplugged from person support apparatus 20 (such as, but not limited to, a dongle). For example, in one embodiment, mobile wireless unit 36 is plugged into the connector in headwall hardware interface 62 that is otherwise used to couple cable 92 between person support apparatus 20 and connector 44. Thus, if a wireless connection to connector 44 is desired, mobile wireless unit 36 is plugged into headwall hardware interface 62 instead of a cable. This enables wireless communication between person support apparatus 20 and headwall interface 38 without having to make any modifications to person support apparatus. When so constructed, mobile wireless unit 36 can therefore be used to convert existing person support apparatuses 20 that do not include wireless communication abilities into person support apparatuses that are capable of wireless communication. Further, when so constructed, mobile wireless unit 36 communicates with main controller 66, audio amplifier 68, and mobile locator transceiver 64 via headwall hardware interface 62, rather than directly (as it does in the embodiment shown in FIG. 4).

Mobile wireless unit 36 further communicates with mobile locator transceiver 64. Mobile locator transceiver 64 is adapted to wirelessly communicate with a nearby fixed locator unit 94 (FIG. 4). Fixed locator units 94 are positioned at fixed locations around a healthcare facility, such as adjacent each individual bay or area that a bed, or other person support apparatus, is customarily positioned. For example, in a typical hospital room that is designed to accommodate two patients, a first fixed locator unit 94 would be positioned adjacent the area in the room where the first bed was normally located, and a second fixed locator unit 94 would be positioned adjacent the area in the room where the second bed was normally located.

Each fixed locator unit 94 includes a controller 96, a battery 98, and a fixed locator transceiver 100. Controller 96 is programmed with a unique ID that uniquely identifies each individual fixed locator unit 94 within a given healthcare facility from each and every other fixed locator unit 94 within that healthcare facility. Further, controller 96 is programmed to respond to any interrogation from a mobile locator transceiver 64 by transmitting that unique ID to the interrogating mobile locator transceiver 64. Fixed locator transceiver 100 utilizes infrared waves for communicating with mobile locator transceiver 64 in at least one embodiment, although it will be understood that other communication technologies may be used.

In the optical (infrared) communications embodiment shown in FIG. 4, fixed locator unit 94 is configured such that its transceiver 100 has a communication range that is limited to a relatively small physical area in which a person support apparatus 20 is likely to be positioned. More particularly, the communication range of transceiver 100 is limited such that it cannot communicate with a person support apparatus 20 that is positioned near a second transceiver 100 of a second fixed locator unit 94. Thus, for example, in a hospital room adapted to accommodate up to two patients in two different beds, a first fixed locator unit 94 has a communication range that does not extend beyond the area in which the first bed is normally positioned. Likewise, the second fixed locator unit 94 has a communication range that does not extend beyond the area in which the second bed is normally positioned. Thus, when a first bed, or other first person support apparatus 20, is positioned in the first area of the room, the first bed is only able to communicate with the first fixed locator transceiver 100 of the first fixed locator unit 94, and it is not able to communicate with the second fixed locator transceiver 100 of the second fixed locator unit 94. Consequently, when the first bed, or other first person support apparatus, sends out an interrogation signal via its mobile locator transceiver 64, it will only receive a response from first fixed locator transceiver 100, and not second fixed locator transceiver 100, which is out of its communication range. Thus, the first bed will receive the unique ID of the first fixed locator unit 94 and the second bed—when placed in the area of the room where the second bed normally resides (e.g. adjacent second fixed locator unit 94)—will receive the unique ID of the second fixed locator unit 94.

The trigger for person support apparatus 20 sending out one or more interrogation signals to a fixed locator unit 94 using mobile locator transceiver 64 can vary in different embodiments. In one embodiment, controller 58 instructs transceiver 64 to send out an interrogation signal whenever the brakes of person support apparatus 20 are applied (as detected by a brake sensor 78, which communicates this information to controller 58 through main controller 66) and/or whenever an A/C power cord of person support apparatus 20 is plugged into an A/C wall outlet (as is detected by an A/C power sensor 78, which communicates this information to controller 58 through main controller 66). After sending out the interrogation signal, mobile locator transceiver 64 awaits the response from fixed locator unit 94 that contains the unique ID of that particular fixed locator unit 94. Mobile wireless unit 36 uses this unique ID in determining which headwall interface 38 to communicate with, as will be explained in further detail below with reference to FIG. 5.

In one embodiment, fixed locator units 94 are bed bay wall modules sold by Stryker Corporation of Kalamazoo, Michigan as part of its Connected Hospital product line. In another embodiment, fixed locator units 94 may be one or more of the locating units disclosed in commonly assigned U.S. Pat. No. 8,102,254 issued to David Becker et al. and entitled LOCATION DETECTION SYSTEM FOR A PATIENT HANDLING DEVICE, the complete disclosure of which is incorporated herein by reference.

In yet another embodiment, fixed locator units 94 may be part of a conventional locating and tracking system that is adapted to detect the presence, and location of, assets that are equipped with ID tags, such as, but not limited to, RF ID tags. When this embodiment is implemented, person support apparatuses 20 each include an asset tag, thereby enabling the locating and tracking system to determine the location of the person support apparatus. This location information is then forwarded to the person support apparatus 20, either via headwall connector 44, or wirelessly from a local area network of the hospital using one of the transceivers contained within radio module 90 of headwall interface 38 (which then forwards the information to person support apparatus. Once person support apparatus 20 knows its current location, it utilizes a database indicating which headwall interface 38 it should communicate with based upon its current location. This database may be completely stored in memory on board person support apparatus 20, or the relevant portions of it may be forwarded to person support apparatus 20 in the same manner that the current location of person support apparatus is forwarded.

Figure 5:
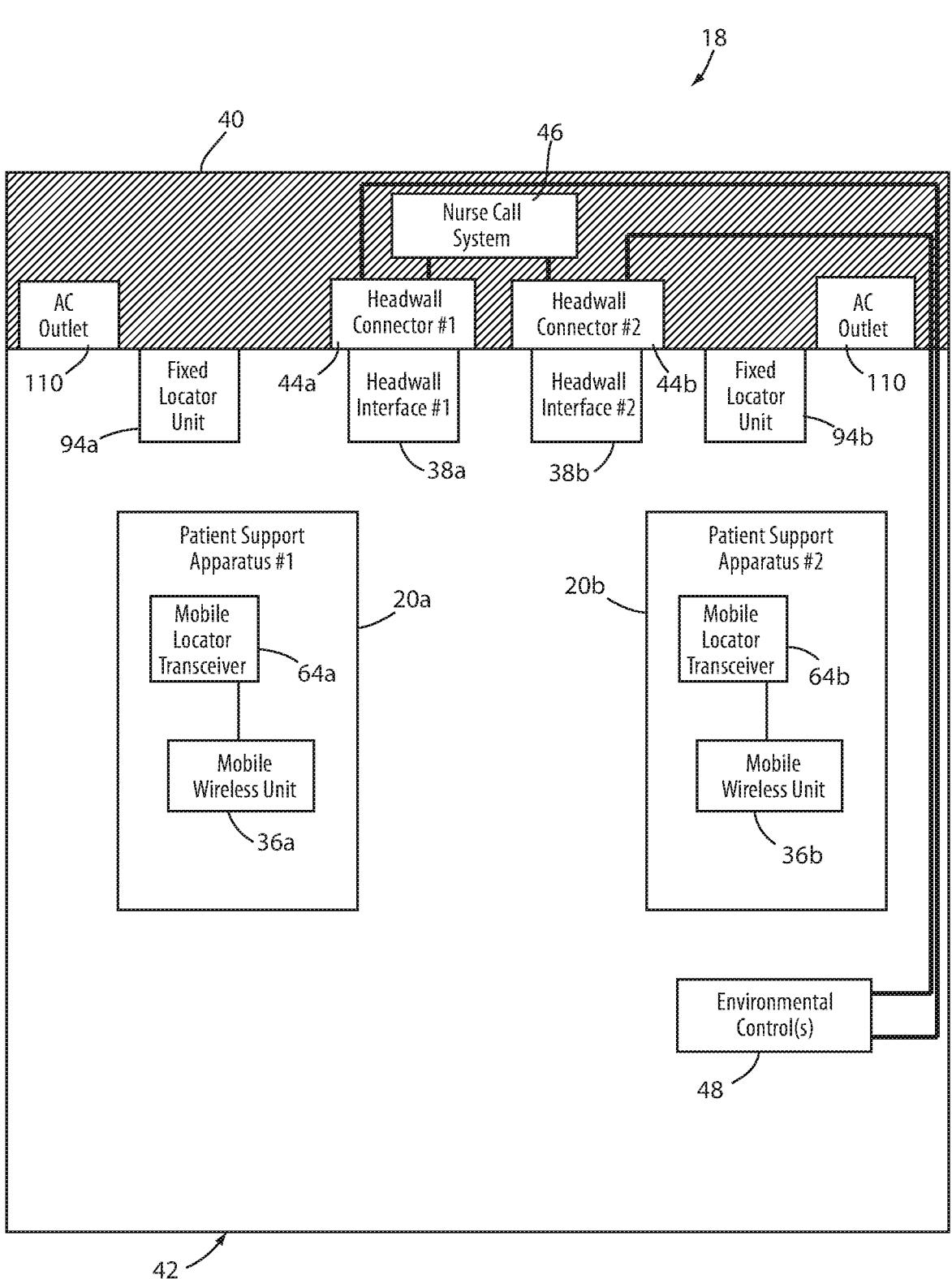
FIG. 5 is a plan view diagram of a room showing an illustrative layout of the person support apparatus system.

FIG. 5 illustrates an arbitrary layout of a person support apparatus system 18 including an arbitrary room 42 of a healthcare facility in which two person support apparatuses 20*a* and 20*b* are positioned. The manner in which each of the person support apparatuses 20*a* and 20*b* automatically establish a communication link with the corresponding headwall interface 38*a* and 38*b* will now be described with reference to FIG. 5. When first and second headwall interfaces 38*a* and 38*b* are initially installed within room 42, the unique ID of first fixed locator unit 94*a* is input into first headwall interface 38*a* and the unique ID of second locator unit 94*b* is input into second headwall interface 38*b*. The inputting of this data into each of units 94*a* and 94*b* may take on a variety of different forms, such as by setting appropriate dip switches on each of units 94*a* and 94*b* that corresponds to the unique IDs; uploading the unique IDs via a USB port, or other type of electronic port, integrated into each headwall interface 38*a* and 38*b*; having each headwall interface 38*a* and 38*b* connect to a server on a local area network using, for example, WiFi transceiver 84*b*, and downloading from the server the corresponding unique IDs; or by other means. Regardless of the manner of inputting this information, headwall interface 38*a* is configured during set-up to have stored in its memory the unique ID of its corresponding fixed locator unit 94*a*; and headwall interface 38*b* is configured during set-up to have stored in its memory the unique ID of its corresponding fixed locator unit 94*b*.

After mobile locator transceiver 64*a* of first person support apparatus 20*a* receives the unique ID from fixed locator unit 94*a*, it transmits a message via mobile wireless unit 36 that contains this unique ID using its radio module 60. Because radio module 60 uses radio frequency transmissions, this transmission will typically and likely have a transmission range that is broad enough such that both headwall interfaces 38*a* and 38*b* will receive it (and possibly other headwall interfaces 38 that are positioned in other rooms within the healthcare facility). When each of first and second headwall interfaces 38*a* and 38*b* receive this message, they will each check the unique ID that is included within the message and compare it to the unique ID stored in their memories that correspond to the unique ID of their associated fixed locator unit 94*a* and 94*b*, respectively. In this case, first headwall interface 38*a* will make this comparison and determine that it is a match, while second headwall interface 38*b* will make this comparison and determine that it is not a match. Second headwall interface 38*b* will therefore ignore this message, while first headwall interface 38*a* will respond with one or more messages that establish a communication link between first person support apparatus 20*a* and first headwall interface 38*a*.

The initial message sent by person support apparatus 20*a* to wireless headwall interface 38*a* (which may be received by headwall interface 38*b* and/or other interfaces 38) also contains, in at least one embodiment, an ID that uniquely identifies person support apparatus 20*a*. When headwall interface 38*a* responds to this message, it includes this person support apparatus ID within its message. In this manner, if second person support apparatus 20*b* also detects this responsive message, second person support apparatus 20*b* will ignore this message because it contains the unique ID of first person support apparatus 20*a*, and therefore is not intended to be acted upon by second person support apparatus 20*b*. Subsequent messages between person support apparatus 20*a* and headwall interface 38*a* will include the unique ID from locator unit 94*a* and/or the unique person support apparatus ID of person support apparatus and/or some other set of unique IDs that enable the messages passed between headwall interface 38*a* and person support apparatus 20*a* to be distinguished from messages that may be being transmitted between second person support apparatus 20*b* and second headwall interface 38*b*, and/or between other person support apparatuses 20 and their corresponding headwall interfaces 38. The use of such IDs enables person support apparatus 20*a* and headwall interface 38*a* to set up a communications link in which their messages are ignored by other devices that may receive them, as well as to ignore messages that they may receive from other devices that do not include the correct IDs.

Second person support apparatus 20*b* sets up a communication link with second headwall interface 38*b* in a similar manner. That is, mobile locator transceiver 64*b* of the second person support apparatus 20*b*, after receiving the unique ID from second locator unit 94*b*, forwards a message via mobile wireless unit 36*b* that contains the unique ID from second locator unit 94*b*. This message is received by second headwall interface 38*b* (as well as possibly other headwall interfaces 38). Because second headwall interface 38*b* is the only headwall interface 38 that has the unique ID corresponding to second fixed locator unit 94*b* stored in its memory, it will be the only headwall interface to respond to the message from second person support apparatus 20*b*. The initial message from second person support apparatus may also contain a unique ID to second person support apparatus 20*b*, which second headwall interface 38*b* includes in subsequent messages to second person support apparatus 20*b* so that those messages are not acted upon by other person support apparatuses. Alternatively, messages between second person support apparatus 20*b* and second headwall interface 38*b* can each include the unique ID of second fixed locator unit 94*b*, which will also distinguish these messages from other messages (such as those being passed back and forth between first person support apparatus 20*a* and first headwall interface 38*a*), thereby allowing the communication link between second person support apparatus 20*b* and second headwall interface 38b to ignore messages that are not intended for either of them, as well as to send messages that are ignored by other devices that are not intended recipients.

In one embodiment, the trigger for a person support apparatus 20 to send an initial message to its corresponding headwall interface is the actuation of a brake on board person support apparatus 20. In some embodiments, as mentioned, the activation of the brake is also the trigger for sending an interrogation signal from mobile locator transceiver 64 to an adjacent fixed locator unit 94. In those embodiments, mobile wireless unit 36 waits until mobile locator transceiver 64 receives a response to its interrogation signal that includes the unique ID of the responding fixed locator unit 94 before transmitting its initial message to headwall interface 38. In other embodiments, the trigger for a person support apparatus 20 to send an initial message to its corresponding headwall interface 38 is the connection of a power cable into a wall A/C outlet, as sensed by an appropriate sensor 78. In still other embodiments, other triggers are used.

The establishment of a communication link between a person support apparatus 20 and its corresponding headwall interface 38 takes place automatically without requiring any steps on the part of a caregiver that are specific to this process. In other words, the caregiver does not need to press a button, flip a switch, or manipulate any controls on either person support apparatus 20 or headwall interface 38. Similarly, a caregiver does not need to identify to person support apparatus 20 which specific headwall interface 38 it is supposed to communicate with, such as by plugging an A/C power cord of the person support apparatus 20 into a specific A/C outlet that is associated with a specific headwall interface 38, or by any other means. Instead, the mere positioning of person support apparatus 20 within the vicinity of fixed locator unit 94 and the performance of normal and otherwise desired steps—such as activating the brakes or plugging in an A/C power cord of person support apparatus 20—will automatically cause person support apparatus 20 to establish a communication link with the corresponding headwall interface. Further, as was described above, this automatic establishment will take place without requiring user intervention even in situations where there are multiple headwall interfaces 38 that are within communication range of person support apparatus 20. In other words, person support apparatus 20 will not only automatically establish a communication link with a headwall interface 38, it will also automatically select the correct headwall interface 38 to make that communication link with.

Figure 6:
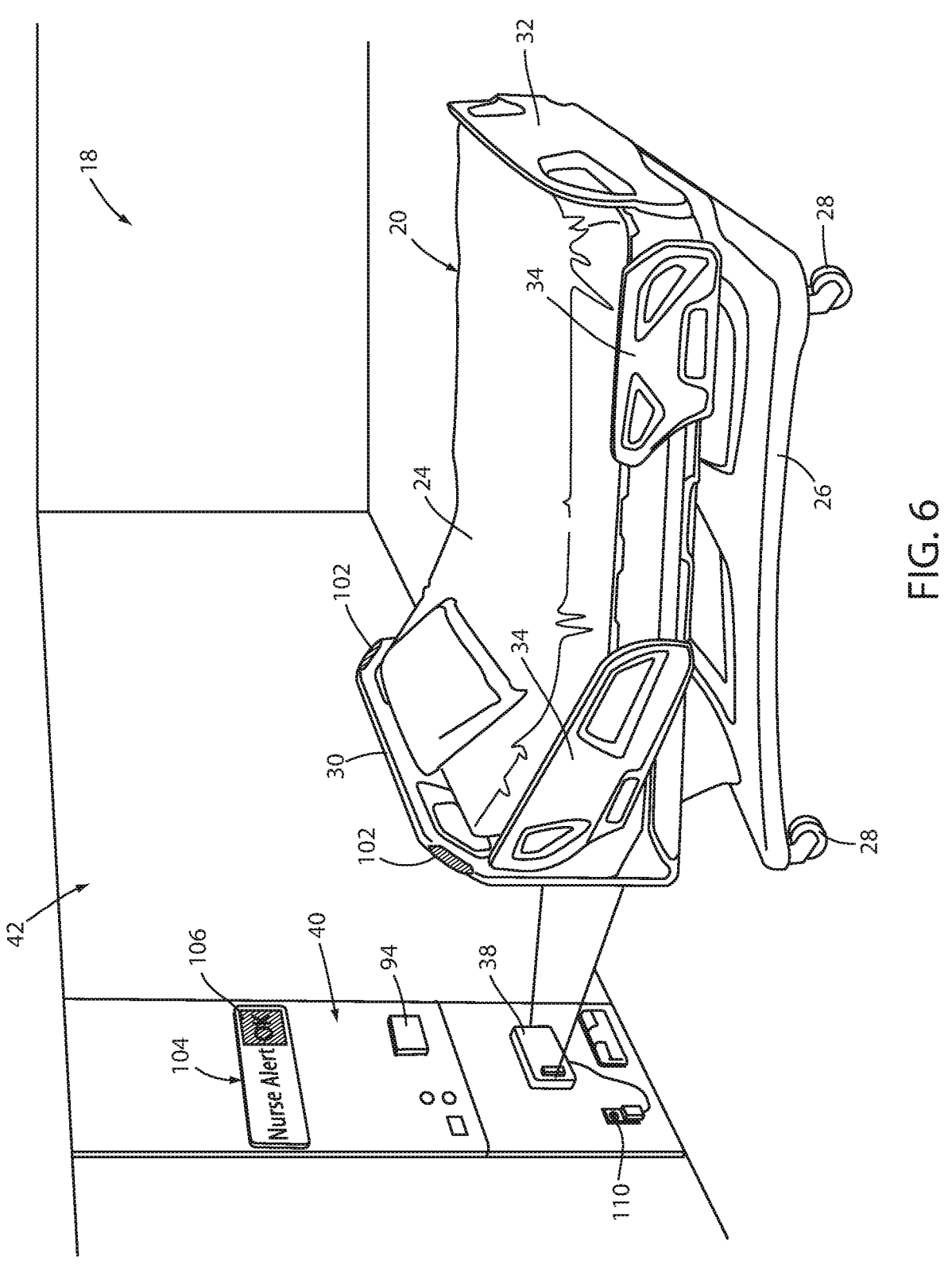
FIG. 6 is a perspective view of the person support apparatus system showing the person support apparatus in a state where a communication link with the headwall interface is established.

As shown in FIG. 6, person support apparatus 20 includes a plurality of lights 102 that are illuminated to provide an indication to users of person support apparatus 20 whether or not the communication link between mobile wireless unit 36 and its corresponding headwall interface 38 has been, and currently is, successful. In the particular embodiment shown in FIG. 6, lights 102 are positioned at a head end of person support apparatus 20, which is normally positioned closest to headwall 40. More specifically, lights 102 are integrated into headboard 30 of person support apparatus, and include a first light positioned on a first side of headboard 30 and a second light positioned on a second side of headboard 30. By being positioned on headboard 30, lights 102 are typically visible to a user regardless of the angular orientation of a head section of person support apparatus 20. Further, by being positioned at the head end of person support apparatus 20, which is closest to headwall 40, the lights create a visual suggestion of the association of the person support apparatus

20 to the adjacent headwall 40 (and its headwall interface 38). Other arrangements, numbers, and/or positions of lights 102 may be implemented on person support apparatus 20.

Prior to mobile wireless unit 36 of person support apparatus 20 establishing a communication link with the corresponding headwall interface 38, lights 102 are maintained in a first state (such as off, or illuminated with a particular color). After mobile wireless unit 36 of person support apparatus 20 establishes a communication link with the corresponding headwall interface 38, controller 58 (or controller 66) changes the illumination state of lights 102 to a second state (such as turning on the lights, or changing their color). In one embodiment, lights 102 are illuminated green when a communication link between person support apparatus 20 and headwall interface 38 is established; lights 102 are not illuminated when no link is established; lights 102 are illuminated red (either static or flashing) when a previously established communication link is unintentionally interrupted or terminated, or when a communication link is not established within a predetermined amount of time after the trigger (e.g. brake or power cord) for establishing the communication has occurred; and lights 102 are illuminated yellow (either static of flashing) when a previously established communication link is intentionally being terminated. These latter two situations are discussed in greater detail below.

Headwall interface 38, in at least one embodiment, also includes one or more lights 108 (FIG. 2) that have their illumination states changed based on the status of the communication link with a particular person support apparatus 20. For example, in one embodiment, headwall interface 38 includes one or more lights 102 that are illuminated green when this link is established, that are not illuminated when no link has been established, that are illuminated red when a previously established link is unintentionally terminated or interrupted, and that are illuminated yellow when a previously established communication link is in the process of being intentionally terminated. Other colors and/or illumination states may be implemented in other embodiments.

In at least one embodiment, headwall interface 38 is also communicatively coupled to a wall indicator 104 (FIG. 6). Such communication may be via a wired connection to wall indicator 104, or it may be via a wireless connection carried out using one of the transceivers within radio module 90 of headwall interface 38. Regardless of the type of communication connection, indicator 104 is mounted to headwall 40 at a height higher than support surface 22 so that it remains visible even when occupied by a person. In the embodiment shown in FIG. 6, indicator 104 includes a graphic 106 that is selectively illuminated and/or selectively changed based upon the status of the communication link between headwall interface 38 and person support apparatus 20. For example, when person support apparatus 20 is successfully communicating with its corresponding headwall interface 38, the indicator 104 of FIG. 6 illuminates a graphic that includes the letters "OK." However, if this communication link is unintentionally disconnected or terminated, indicator 104 will change the graphic 106 to a different message, such as the exclamation point shown in FIG. 7. In addition, the color of light with which graphic 106 is illuminated may also be changed, such as from green when the link is successfully established to red when the link is unintentionally disconnected.

Graphic 106 may be changed in any suitable manner. In one embodiment, graphic 106 is displayed on a display, such as a liquid crystal display (LCD), and suitable control circuitry is included within indicator 104 for changing the image displayed on this display, as would be known to one of ordinary skill in the art. In another embodiment, multiple graphics 106 are included on indicator 104, but only one of them is illuminated in accordance with the current status of the communication link between person support apparatus 20 and headwall interface 38. Still other variations are possible.

Figure 7:
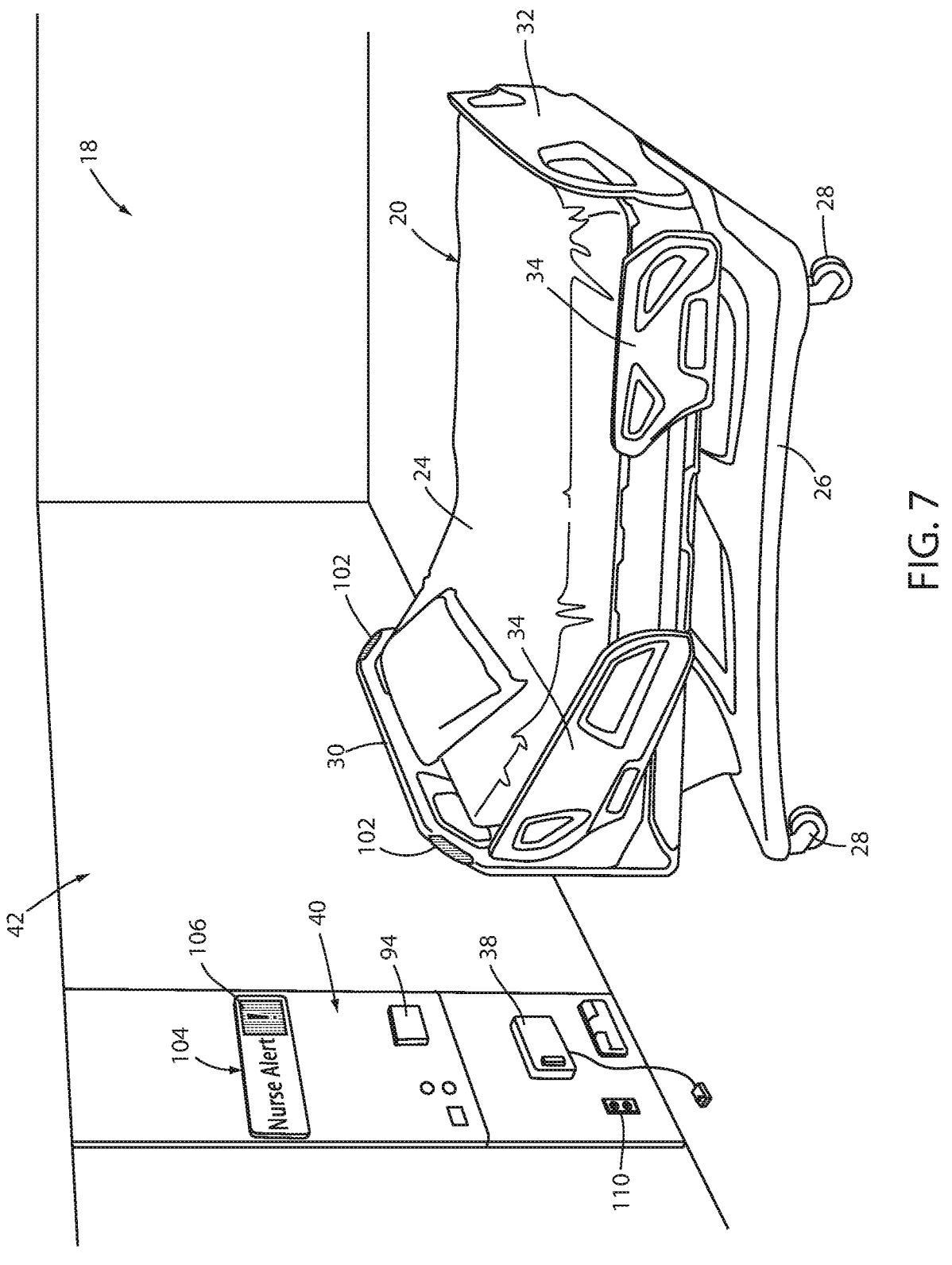
FIG. 7 is a perspective view of the person support apparatus system showing the headwall interface in an unplugged and alerting state.

FIG. 7 illustrates an embodiment of person support apparatus 20, headwall interface 38, and indicator 104 when the state of the communication link between person support apparatus 20 and headwall interface 38 has been unintentionally terminated, interrupted, or otherwise changed to an undesirable state. More specifically, FIG. 7 illustrates headwall interface 38 with its electrical power cable disconnected from an A/C power outlet 110. Although headwall interface 38 includes battery 114 enabling it to run on battery power free from connection to A/C power outlet 110, headwall interface 38 is configured to alert a user of this situation by changing the status of lights 102, wall indicator 104, and/or the light(s) on headwall interface 38. Thus, in the example shown in FIG. 7, lights 102 of person support apparatus 20 are illuminated in a red color, and indicator 104 illuminates graphic 106 with a red color as well. Further, as was noted, graphic 106 has been changed from the "OK" letters shown in FIG. 6 to the exclamation point shown in FIG. 7. This provides a clear and unmistakable visual alert to any users within the vicinity of person support apparatus 20 that an alert condition is present and should be rectified.

In addition to providing visual indications in the vicinity of person support apparatus 20 regarding the disconnection of the A/C power plug of headwall interface 38 from A/C power outlet 110, headwall interface 38 is configured, in at least some embodiments, to also send a "cord out" alert signal to headwall connector 44, which transfers this signal to the nurse call system 46 of the healthcare facility. As was noted previously, where headwall connector 44 is a customary 37 pin connector, such cord out alerts are often generated by either opening or closing the connection between pins 10 and 11, depending upon the type of nurse call system a particular healthcare facility has implemented. Different electrical signals or changes can be made by headwall interface 38 if a different type of connector 44 is used in order to pass the cord out alert to the nurse call system. Typically, the nurse call system will react to this cord out alert by displaying this alert condition on the computer screens of one or more nurse call computers and/or by forwarding this alert information to one or more appropriate caregivers who can rectify this situation.

In addition to sending a cord out alert to the nurse call system 46 when headwall interface 38 has its power cord unplugged from A/C power outlet 110, headwall interface 38 is also adapted to send this cord out alert in other situations as well. For example, any time communication between itself and mobile wireless unit 36 is lost, decreases below a threshold signal strength, or otherwise suffers from any undesirable conditions for more than a threshold amount of time, headwall interface 38 will send a cord out alarm signal to connector 44. The threshold amount of time can vary, but generally is chosen to avoid sending cord out alarm signals for transitory or very brief interruptions in the communication link. Still further, headwall interface 38 is adapted to send a signal to connector 44 that cancels the cord out alarm if the communication link is subsequently re-established.

Figure 8:
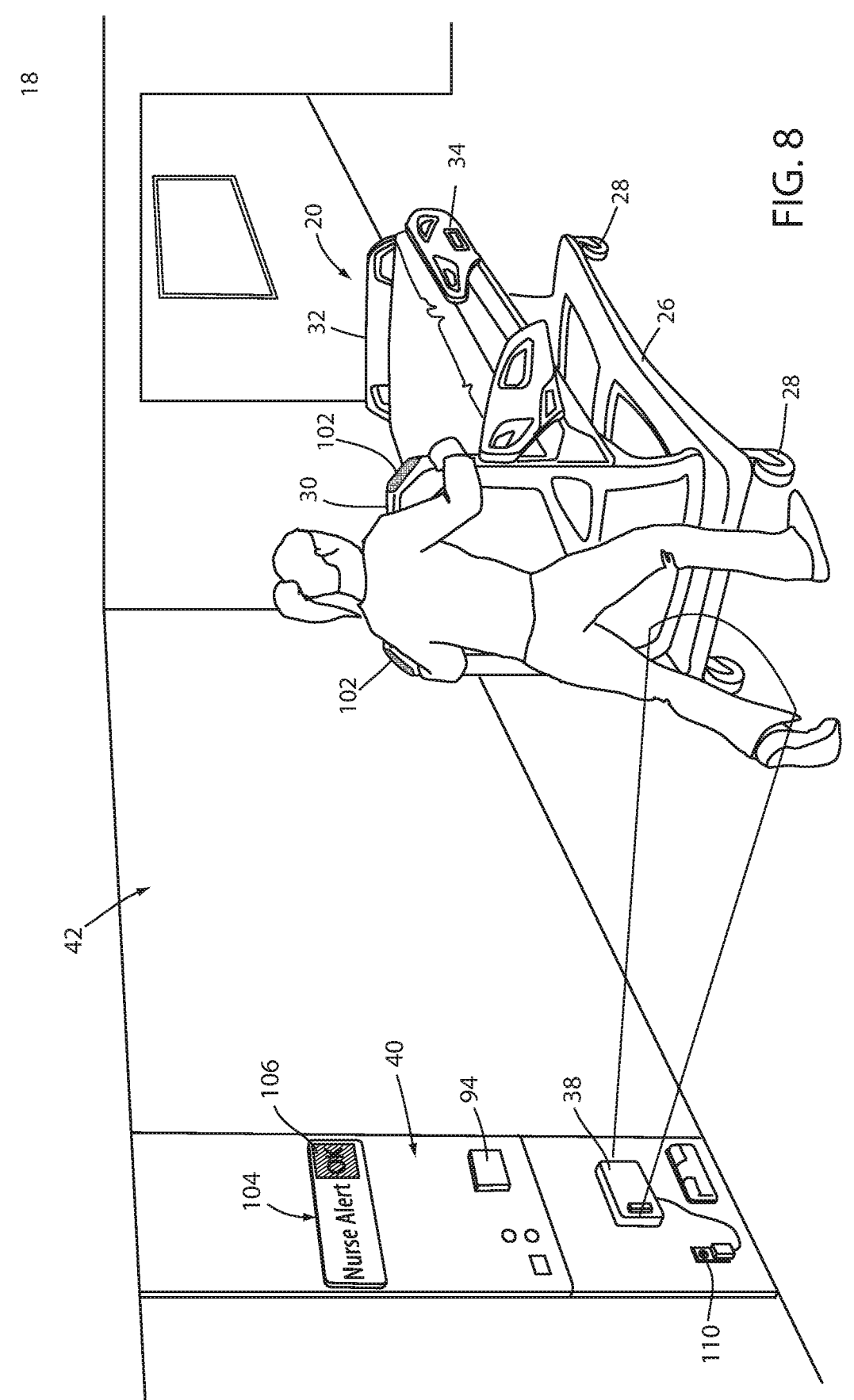
FIG. 8 is a perspective view of the person support apparatus system showing the communication link between the person support apparatus and headwall interface being intentionally terminated as the person support apparatus is moved away from the headwall interface.

FIG. 8 illustrates an embodiment of person support apparatus 20, headwall interface 38, and indicator 104 when the state of the communication link between person support apparatus 20 and headwall interface 38 has been, or is in the process of being, intentionally terminated. In this state, headwall interface 38 is configured to avoid sending a cord out alarm, despite the fact that the communication link between headwall interface 38 and mobile wireless unit 36 is in the process of being terminated. Headwall interface 38 avoids sending this cord out alarm without requiring any user interaction. That is, unlike many conventional nurse call cables that require a caregiver to press a cancel button to stop a cord out alarm when removing the nurse call cable from the headwall (e.g. connector 44), the system of FIG. 8 automatically avoids the cord out alarm without requiring the caregiver to press any cancel button on person support apparatus 20, headwall interface 38, or anywhere else; nor does it require the user to perform any other steps that are specifically tailored to prevent such an alarm. This automatic process is described below.

As can be seen in more detail in FIG. 4, headwall interface 38 includes an interface controller 112, battery 114, a headwall hardware interface 116, a power supply 118, and radio module 90. Controller 112 is, in one embodiment, the same type of controller as controller 58 of mobile wireless unit 36, although it may take on other forms as well. Controller 112 processes the information received from radio module 90 and, where appropriate, sends control signals to headwall hardware interface 116 that cause headwall hardware interface 116 to communicate with headwall connector 44. Headwall hardware interface 116 is, in one embodiment, the same as headwall hardware interface 62 of person support apparatus 20, except that headwall hardware interface 116 is controlled by controller 112 (while headwall hardware interface 62 is controlled by controller 58). Controller 112 also processes signals and/or messages that are received from headwall connector 44, via headwall hardware interface 116, and, where appropriate, forwards them to radio module 90 for transmission to mobile wireless unit 36.

In addition to passing information back and forth between mobile wireless unit 36 and headwall connector 44, headwall interface 38 also monitors the signal strength of the communications it receives from radio module 60. If the signal strength drops below a threshold, or signals are otherwise completely lost, controller 112 instructs headwall hardware interface 116 to issue the cord out alarm. This monitoring of the signal strength is carried out repetitively or nearly continuously, and is carried out regardless of whether or not person support apparatus 20 and headwall connector 44 are communicating information between each other at any given moment. In other words, in situations where neither data nor audio signals are being communicated between person support apparatus 20 and headwall connector 44, headwall interface 38 and mobile wireless unit 36 will repetitively transmit messages back and forth to each other that are used by each other to verify that the communication link between the two is still established. Controller 112 will use these link verification messages to assess signal strength and, if they dip below a threshold for greater than a threshold amount of time, controller 112 will issue the cord out alarm.

Controller 112 carries out the automatic avoidance of a cord out alarm, in one embodiment, by terminating the aforementioned signal strength analysis after it receives a signal from radio module 60 indicating that the brake on person support apparatus 20 has been released. Thus, in this embodiment, whatever happens to the signal strength after the brake is deactivated is ignored by controller 112, at least with respect to generating a cord out alarm. That is, headwall interface 38 will not generate a cord out alarm at any time after the brake has been deactivated.

In an alternative embodiment, controller 112 carries out the automatic avoidance of a cord out alarm by analyzing the signal strength of the signals from radio module 60 and determining whether there is a relatively gradual decrease in these signals. This analysis continues even after a message is received by controller 112 from person support apparatus 20 indicating that the brake has been deactivated. In this embodiment, controller 112 periodically, or continuously, monitors the signal strength of the wireless signals it receives from radio module 60 and generates a baseline or average signal strength reading. After it receives the message from radio module 60 indicating that the brake has been deactivated on person support apparatus 20, it continues to monitor this signal strength and compares it to the baseline or average signal strength. If it detects that this signal strength is gradually decreasing after the brake has been deactivated relative to the baseline or average signal strength, then controller 112 will not send a cord out alarm signal to headwall connector 44, even when the signal strength decreases to zero (or some other unusable level). This is because headwall interface 38 interprets the gradual decrease in signal strength following the release of the brake as an intentional act by a caregiver, or other person, to move person support apparatus 20 to another location.

However, if the signal strength suddenly decreases, rather than gradually decreases, after the brake has been deactivated, headwall interface 38 will still send a cord out alarm because it interprets the sudden loss of signal strength as being due to something other than person support apparatus 20 being moved to a new location. The threshold for distinguishing between a sudden decrease and a gradual decrease in signal strength may vary depending upon the strength of the average or baseline signals, the sampling rate at which signal strength measurements are taken, the frequencies and/or protocols used by radio module 60, as well as other factors.

Any of the above embodiments can also be modified or supplemented with one or more signal strength monitoring algorithms carried out by controller 58 of person support apparatus 20. When so implemented, controller 58 monitors the signals strength of the signals and/or messages passed between person support apparatus 20 and headwall interface 38. If controller 58 ever detects a gradual decrease in signals strength, either alone or in combination with the deactivation of the brake on person support apparatus 20, controller 58 determines that the diminution in signal strength is the result of an intentional disconnection from headwall interface 38 by a caregiver. In this case, controller 58 transmits one or more higher strength signals to headwall interface 38 indicating that person support apparatus 20 has intentionally disconnected, or is in the process of intentionally disconnecting, from headwall interface 38. Interface 38 therefore does not trigger a cord out alarm.

Still further, in any of the embodiments disclosed herein, when controller 58 unintentionally loses communication with headwall interface 38, controller 58 is programmed to send one or more higher strength signals to headwall interface to attempt to re-establish communication with headwall interface. Alternatively, or additionally, controller 112 is also programmed to send one or more higher strength signals to person support apparatus 20 any time it detects an unintentional disconnection with person support apparatus 20. To the extent communication between headwall interface 38 and person support apparatus 20 cannot be re-established through such higher power signals, headwall interface 38 sends a cord out alert signal to headwall connector 44.

Headwall interface 38 continues to provide—similar to many currently existing systems that use nurse call cables to connect beds to headwall connectors—cord out alarms in situations where communication with person support apparatus 20 is unintentionally lost, and to avoid cord out alarms in situations where communication with person support apparatus 20 is intentionally lost. However, headwall interface 38 and mobile wireless unit 36 improve upon conventional nurse call cable systems in that, not only do they not require the manual disconnection of a cable, they also do not require any specific steps by a caregiver to silence, cancel, or otherwise prevent a cord out alarm in those situations where the communication link is being intentionally disestablished.

In another embodiment, instead of, or in addition to, using the brake deactivation signal from person support apparatus 20 as the trigger for either stopping a potential cord out alarm or for analyzing signal strengths to determine whether a gradual or sudden decrease occurs, controller 112 can be configured to use a power cord disconnection signal from person support apparatus 20 as this trigger. In other words, in one other embodiment, controller 112 does not issue any cord out alerts after someone unplugs the A/C power cord on person support apparatus 20; while in still another embodiment, controller 112 only issues a cord out alert if a sudden decrease in signal strength occurs after the A/C power cord of the person support apparatus is unplugged, but does not issue a cord out alert after this A/C cord has been unplugged if the signal strength gradually decreases.

In still other embodiments, one or more motion sensors may be incorporated into person support apparatus 20 to detect movement of person support apparatus 20 along the floor. When such movement is detected, controller 112 does not issue any cord out alerts to connector 44, regardless of signal strength.

As was mentioned earlier, in the intentional disconnection situation of FIG. 8, controller 58 and/or controller 66 of person support apparatus 20 may be configured to change the status of lights 102 on person support apparatus 20 in order to provide visual indication to a caregiver that headwall interface 38 has determined that its communication link with mobile wireless unit 36 is being intentionally disestablished. Such indication may include changing the color of lights 102, such as to yellow, or other changes. Such indications provide a visual signal to the caregiver that a cord out alert is not going to be triggered. Further, such indications provide a fail-safe visual indication to the caregiver that helps avoid potential malfunctions of headwall interface 38. That is, if headwall interface 38 incorrectly determines that the communication link between itself and person support apparatus 20 is being intentionally disconnected, a caregiver will be alerted to this incorrect determination through the visual indications provided by lights 102. In other words, if the caregiver sees lights 102 providing an indication of an intentional communication link disconnection when the caregiver did not want such an intentional disconnection, he or she can take steps to ensure that communication link remains established and/or that the cord out alarm feature is not disabled.

Wall indicator 104 may also provide a visual indication similar to those provided by lights 102 on person support apparatus 20 that indicates an intentional disconnection of the communication link between person support apparatus 20 and headwall interface 38. The illumination of lights 102 on person support apparatus 20 may be carried out in response to a message sent by headwall interface 38 to person support apparatus 20, or it may be carried out based upon the results of signal strength analysis performed by controller 58. In the latter case, controller 58 carries out its own signal strength analysis similar to that described above and changes the state of lights 102 when an intentional disconnection situation is detected.

Figure 9:
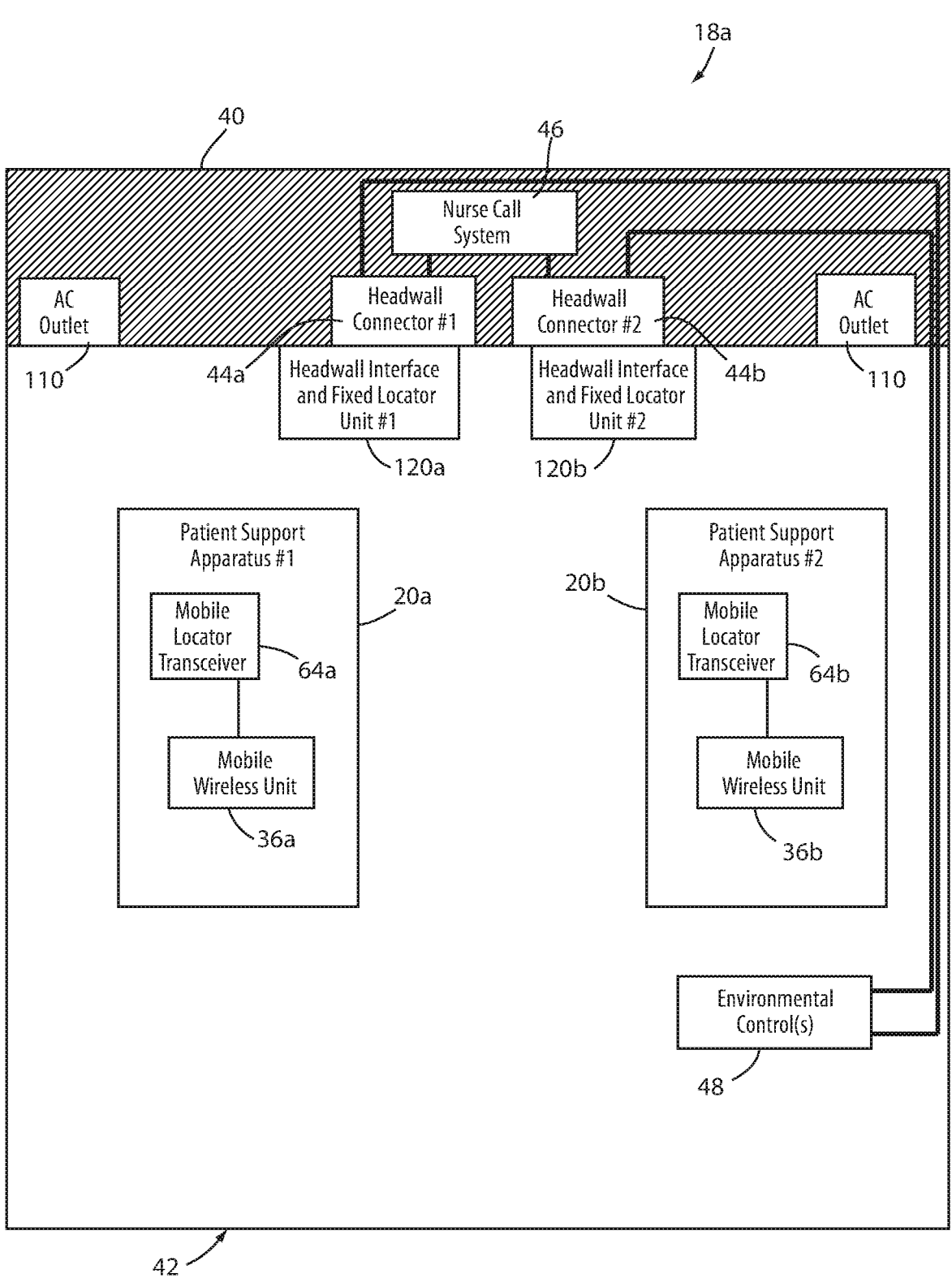
FIG. 9 is a plan view diagram of a room showing an illustrative layout of an alternative person support apparatus system.

FIG. 9 illustrates an arbitrary layout of a person support apparatus system 18a according to an alternative embodiment. Those components of person support apparatus system 18a that are common to system 18, and that operate in the same manner as in system 18, are labeled with the same reference numbers and are not described further below. Those components that are different are labeled with a new number, or with a modified number. Person support apparatus system 18a differs from person support apparatus system 18 in that fixed locator units 94 and headwall interfaces 38 of system 18 have been combined into a single interface unit 120. That is, person support apparatus system 18a includes a plurality of combined locator and headwall interfaces 120 that provide the same function in a single unit as is provided by the separate units 94 and interfaces 38 of system 18.

Thus, in the arbitrary layout shown in FIG. 9, when first person support apparatus 20a is first moved into the location shown therein, its mobile locator transceiver 64a sends an interrogation signal out to first combined locator and headwall interface unit 120a. First combined locator and headwall interface unit 120a receives this interrogation signal and responds to it with a reply signal that includes an ID that is unique to first combined locator and headwall interface unit 120a. This response is transmitted by a fixed locator transceiver 100a (not labeled in FIG. 9) contained within first combined locator and headwall interface unit 120a. Because fixed locator transceiver 100a uses optical (infrared) communication, or some other form of communication which limits its range to a small area in which first person support apparatus is located (and excludes the area where second person support apparatus 20b is located), only first person support apparatus 20a receives this response message. The limited range of transceivers 64a and 100a ensures that only first person support apparatus 20a and first combined headwall and interface unit 120a communicate with each other, just as the limited range of transceivers 64b and 100b of second person support apparatus 20b and second combined locator and interface unit 120b ensures that only these two devices communicate with each other.

After mobile locator transceiver 64a of first person support apparatus 20a receives the response message back from first combined locator and interface unit 120a, it passes the unique ID it received in that message to first mobile wireless unit 36a. First mobile wireless unit 36a uses this ID in the same manner previously discussed. That is, it includes this ID in messages it sends from the one or more transceivers within its radio module 60a to first combined locator and interface unit 120a. Because these transceivers do not have the limited range of mobile locator transceiver 64a, the messages they sent will likely be received by second combined locator and interface unit 120b, as well as possible other combined locator and interface unit 120 in other rooms. However, because these other combined locator and interface units 120 have a different ID than the one included in the messages sent by the transceivers of first radio module 60a of first person support apparatus 20a, they will be ignored by these other units 120 because these other units 120 are not the intended recipient.

Second person support apparatus 20b will automatically establish a communication link with second combined locator and interface unit 120b in a similar manner as first person support apparatus and first combined locator and interface unit 120a. Once a communication link has been established between a person support apparatus 20 and its corresponding combined locator and interface unit 120 in system 18a, the system will operate in the same manner as was described above with respect to system 18. Thus, system 18a differs from system 18 only in that the functionality of locator units 94 and headwall interfaces 38 are combined into a single unit.

Figure 10:
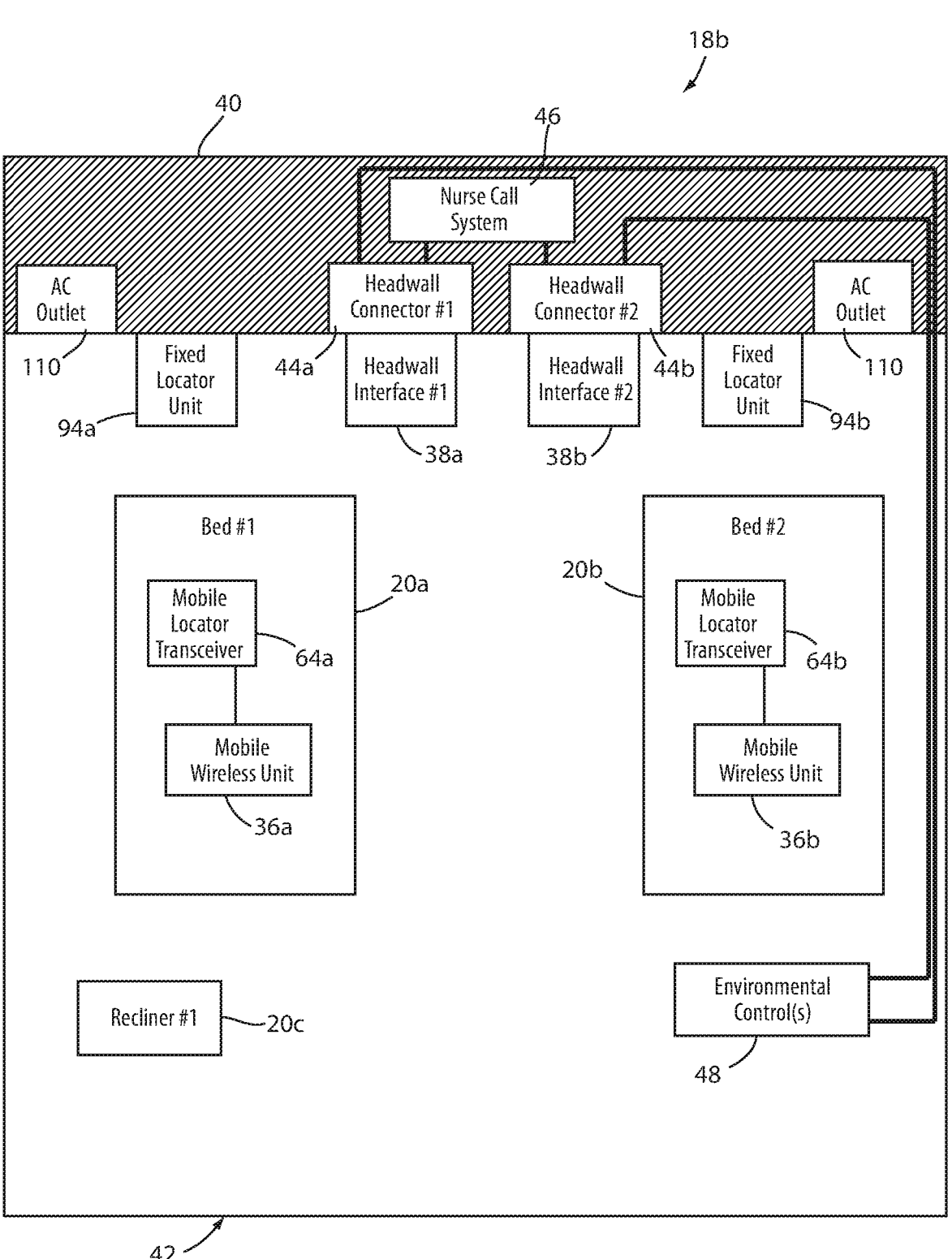
FIG. 10 is plan view diagram of a room showing an illustrative layout of yet another alternative person support apparatus system.

FIG. 10 illustrates another embodiment of a person support apparatus system 18b. Those components of person support apparatus system 18b that are common to system 18, and that operate in the same manner as in system 18, are labeled with the same reference numbers and are not described further below. Those components that are different are labeled with a new number, or with a modified number. Person support apparatus system 18b differs from person support apparatus system 18 in that it includes the ability of multiple person support apparatuses 20 to communicate with a single headwall interface 38. For example, in the exemplary layout of FIG. 10, first and second person support apparatus and 20b are specifically beds, while third person support apparatus 20c is a recliner. Further, both person support apparatuses 20a and 20c communicate with first headwall interface 38a. The communication between person support apparatus 20a and first headwall interface 38a operates in the same manner described above.

The communication between person support apparatus 20c and first headwall interface 38a may operate in either of two different ways, depending upon the embodiment of person support apparatus 20c and/or 20a. The first manner is direct communication. The second manner is intermediated communication. In the first manner, person support apparatus 20c uses one or more of its wireless transceivers (contained within a radio module 60) to directly communicate with first headwall interface 38a. In the second manner, person support apparatus 20c uses one or more of its wireless transceivers to communicate with person support apparatus 20a, which then shuttles messages and signals, as appropriate, back and forth between first headwall interface 38a and person support apparatus 20c. Person support apparatus 20a therefore acts as an intermediary between person support apparatus 20c and first headwall interface 38a in this second type of communication.

Person support apparatus 20c may take on a wide variety of different forms. In one embodiment, person support apparatus 20c is implemented in accordance with any of the recliner embodiments disclosed in commonly assigned U.S. patent application Ser. No. 14/212,323 filed Mar. 14, 2014 by inventors Christopher Hough et al. and entitled MEDICAL SUPPORT APPARATUS, the complete disclosure of which is hereby incorporated herein by reference. Person support apparatus 20c can, of course, take on other forms.

Notably, in at least one embodiment, person support apparatus 20c does not include any mobile locator transceiver 64, such as is included with person support apparatuses 20a and 20b. Person support apparatus 20c therefore does not establish its communication link with first headwall interface 38a in the same manner as person support apparatuses 20a or 20b. Rather, in at least one embodiment, person support apparatus 20c establishes its communication link (whether direct or intermediated) with headwall interface 38a by first associating itself with person support apparatus 20a. Once this association takes place, person support apparatus 20c either receives the unique ID of first headwall interface 38a from person support apparatus 20a and uses it to communicate directly with first headwall interface 38*a*; or person support apparatus 20*c* receives a unique ID from person support apparatus 20*a* that uniquely identifies person support apparatus 20*a*, and person support apparatus 20*c* uses this ID to communicate with person support apparatus 20*a*, which acts as an intermediary for communication with first headwall interface 38*a*.

The manner in which the association between person support apparatuses 20*a* and 20*c* is accomplished can take on a variety of different forms. In one embodiment, person support apparatus 20*a* and/or person support apparatus 20*c* include at least one near field transceiver that has a limited communication range and, whenever the two apparatuses are within this limited communication range, they associate with each other. Because this communication range is relatively small, person support apparatus 20*c* will not associate itself with person support apparatus 20*b*, for person support apparatus 20*b* is located outside this range. Alternatively, if person support apparatus 20*b* were located within this range, person support apparatus 20*c* can be implemented to automatically associate itself with only the person support apparatus that is closer (such as determined by evaluations of signal strengths, or by other means). Techniques such as these for associating person support apparatus, as well as other medical devices, are disclosed in more detail in commonly assigned, U.S. patent application Ser. No. 13/802,992 filed Mar. 14, 2013 by inventors Michael Hayes et al. and entitled COMMUNICATION SYSTEMS FOR PATIENT SUPPORT APPARATUSES, the complete disclose of which is incorporated herein by reference. Thus, any of the techniques disclosed in this '992 patent application may be used with system 18*b* to enable person support apparatus 20*c* to associate itself with person support apparatus 20*a* (while avoiding an association with person support apparatus 20*b*). Alternatively, still other techniques, such as manual association carried out by a caregiver manipulating suitable controls on either person support apparatus 20*a* and/or 20*c* can be used to associate these two apparatuses together.

Once person support apparatus 20*c* is associated with person support apparatus 20*a* and receives a unique ID corresponding to either first headwall interface 38*a* or person support apparatus 20*a*, person support apparatus 20*c* is configured to forward any one or more of the messages described above to first headwall interface 38*a* (either directly or via person support apparatus 20*a*). Such messages may include, for example, an alert from an occupant exit detection system incorporated into person support apparatus 20*c*, a nurse call signal from a nurse call button incorporated into person support apparatus 20*c*, the status of brakes of person support apparatus 20*c*, the height of person support apparatus 20*c* (such as the height of a seat on person support apparatus 20*c*), voice signals from a microphone on person support apparatus 20*c*, signals for any of the environmental controls 48 (e.g. television, radio, temperature, curtains, etc.), and/or other messages. Similarly, first headwall interface 38*a* is configured to forward any of the messages described above to person support apparatus 20*c* (either directly or via person support apparatus 20*a*), such as, but not limited to, voice signals from a remotely positioned caregiver (which are amplified and played on a speaker on person support apparatus 20*c*), control signals adapted to control one or more features on person support apparatus 20*c*, and/or other messages.

In one embodiment, first headwall interface 38*a* is adapted to monitor the location of a patient associated with person support apparatus 20*a* and person support apparatus 20*c* (and not a patient associated with person support apparatus 20*b*). By continuously monitoring this location, first headwall interface 38*a* knows whether to transmit to person support apparatus 20*a* or 20*c* any signals or messages it receives from headwall connector 44. In other words, if voice signals from a remotely positioned caregiver are being received by first headwall interface 38*a* from first headwall connector 44*a*, first headwall interface 38*a* forwards those voice signals to either person support apparatus 20*a* or 20*c*, depending upon where the patient associated with these two apparatuses is currently located. If the person is currently on person support apparatus 20*c*, the signals or message are forwarded to person support apparatus 20*c*. If the person is currently on person support apparatus 20*a*, the signals or messages are forwarded to person support apparatus 20*a*. In those instances where the person is not on either person support apparatus 20*c* or 20*a* (or his or her location is unknown), first headwall interface 38*a* forwards the signals or messages to both person support apparatuses 20*a* and 20*c*. In an alternative embodiment, first headwall interface 38*a* includes a user-configurable setting that determines where to send those messages or signals in situations where the location of the patient is on neither person support apparatus 20*a* nor 20*c*, or is unknown.

First headwall interface 38*a* monitors the location of the patient by analyzing the signals it receives from person support apparatuses 20*a* and 20*c*. Thus, for example, if a patient presses a nurse call button on person support apparatus 20*a*, headwall interface 38*a* knows the patient is on person support apparatus 20*a* when it receives the message from person support apparatus 20*a* indicating that the nurse call button has been pressed. Likewise, if the patient presses a nurse call button on person support apparatus 20*c*, headwall interface 38*a* knows the patient is on person support apparatus 20*c* when it receives the message from person support apparatus 20*c* (either directly or through person support apparatus 20*a*) that the person support apparatus 20*c* nurse call button has been pressed. First headwall interface 38*a* also monitors the location of the patient by analyzing other signals received from person support apparatuses 20*a* and 20*c*. For example, either or both of person support apparatuses 20*a* and 20*c* may include an occupant exit detection system that a caregiver can selectively arm and disarm. Whenever either of these occupant exit detection systems is armed, the corresponding person support apparatus 20*a* or 20*c* sends a signal to headwall interface 38*a* indicating this armed status. Headwall interface 38*a* interprets the arming of the exit detecting system of person support apparatus 20*a* as indicating that the patient is currently on person support apparatus 20*a*, while it interprets the arming of the exit detection system of person support apparatus 20*c* as indicating that the patient is currently on person support apparatus 20*c*.

In other embodiments, person support apparatus 20*a* and/or 20*c* include a scale system, or other sensors, that are capable of detecting the presence of the patient thereon. Information from these signals is forwarded to headwall interface 38 so that it knows the current location of the patient. These other sensors may include sensor for detecting one or more vital signs of the patient, such as any of those sensors disclosed in commonly assigned U.S. Pat. No. 7,699,784 issued to Wan Fong et al. and entitled SYSTEM FOR DETECTING AND MONITORING VITAL SIGNS, or commonly assigned PCT patent application serial number PCT/US2014/026030 filed by Stryker Corporation on Mar. 13, 2014, and entitled PATIENT SUPPORT APPARATUS WITH PATIENT INFORMATION SENSORS, the complete disclosure of both of which are incorporated herein by reference. Other sensors may also be used.

As noted, headwall interface 38*a* uses the patient location information to determine where to direct the messages or signals that it receives from connector 44. Headwall interface 38 may alternatively forward this patient location information to nurse call system 46 so that remotely positioned caregivers are made aware of the patient's current location. Still further, data regarding the patient's location over time may be recorded and stored and used for any suitable purpose, including, but not limited to, assessing the mobility of the patient and/or correlating patient movement with healthcare outcomes.

Figure 11:
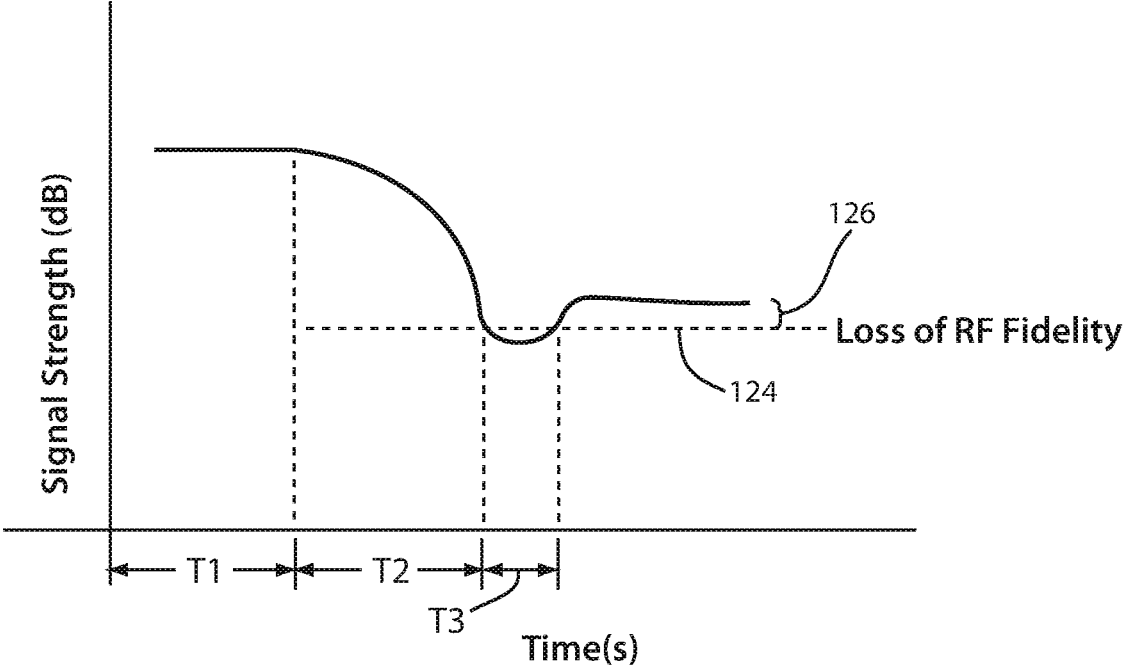
FIG. 11 is a graph of the result of a signal strength modification algorithm applied to the wireless communication between a person support apparatus and its associated headwall interface.

In any of the systems 18, 18*a*, and 18*b* described above, communication between headwall interface 38 and radio module 60 of person support apparatus 20 may be configured to follow a signal strength modification algorithm, the results of which are illustrated in graphical form in FIG. 11. More specifically, when radio module 90 of headwall interface and radio module 60 of person support apparatus 20 begin communicating with each other, they do so at a relatively high signal strength, as illustrated during time T1 of FIG. 11. During a subsequent time T2, the transceivers within radio modules 60 and 90 decrease their signals strengths until, at time T3, they fall below an RF fidelity cutoff level 124. After the signals strengths are below level 124, the transceivers within radio modules 60 and 90 increase their signal strengths until they reach a value that is a threshold amount 126 above the fidelity cutoff level 124. Threshold amount 126 is chosen such that minor variations in the signal strength will not interrupt communications, but will also not utilize significantly more signal strength than is necessary to maintain the communication link between interface 38 and person support apparatus 20. By following this signal strength modification algorithm, the likelihood of a first communication link between a first headwall interface 38*a* and a first person support apparatus 20*a* interfering with one or more other communication links between other interfaces 38 and other person support apparatuses 20, and vice versa, is reduced.

Also, in any of the embodiments of system 18, 18*a*, and/or 18*b* described above, headwall interface 38 can be configured to use one or more of its transceivers (e.g. WiFi transceiver 84*b*) to communicate directly with a local area network (LAN) of the healthcare facility in which it is located. Such communication allows headwall interface 38 to communicate directly with one or more servers on the LAN. In one embodiment, headwall interface 38 is configured to receive software updates from the LAN for updating its own software. In other embodiment, headwall interface 38 is configured to receive software update for the person support apparatus 20 it is communicating with, which headwall interface 38 then sends to the mobile wireless unit 36 of that person support apparatus 20.

In still other embodiments, headwall interface 38 is configured to selectively send some bed messages or signals it receives from person support apparatus 20 directly to the LAN, while sending other signals or messages to headwall connector 44 (or to both destinations in some cases). For example, bed status information (e.g. the status of the brake, the occupant detection or exit detection system, the side rails, the height of support surface 22, etc.) can be forwarded to one or more servers on the LAN for display to appropriate personnel (e.g. caregivers), even in a system 18 where the nurse call system 46 is not equipped to receive and process such messages when they are transmitted to nurse call system 46 via connector 44. Alternatively, even if nurse call system 46 is configured to receive, process, and display some bed status information, the wireless transmission by headwall interface 38 to a server on the LAN enables one or more applications on the LAN to display additional bed status information. Still further, in those embodiments of mobile wireless unit 36 that plug into headwall hardware interface 62 of person support apparatus 20, rather than being directly integrated therein, the addition of mobile wireless unit 36 and headwall interfaces 38 to a particular person support apparatus 20, which was previously unable to wirelessly communicate with a LAN, enables that person support apparatus 20 to be upgraded to allow such direct wireless LAN communication (in addition to their communication environmental controls 48 and nurse call system 46).

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular.

What is claimed is:

1. A headwall interface adapted to be mounted to a wall of a healthcare facility, the headwall interface comprising:
   a first transceiver adapted to wirelessly communicate with a second transceiver positioned onboard a patient support apparatus, the first transceiver adapted to receive patient audio signals of a patient's voice transmitted from the second transceiver onboard the patient support apparatus;
   a communication cable having a plug adapted to plug into a connector mounted on the wall, the plug and connector forming a multi-pin connection when the plug is inserted into the connector; and
   a controller adapted to route the patient audio signals to a particular pin of the multi-pin connection, wherein the controller is adapted to communicate with an indicator adapted to illuminate a graphic in a first manner when a communication link is established between the first and second transceivers, and to illuminate the graphic in a second and different manner when no communication link is established between the first and second transceivers; and
   wherein the headwall interface is adapted to receive electrical power directly from an AC mains line without needing a power cable to be plugged into an AC power outlet.

2. The headwall interface of claim 1 wherein the controller is further adapted to receive nurse audio signals from the communication cable and to transmit the nurse audio signals to the patient support apparatus using the first transceiver.

3. The headwall interface of claim 1 wherein the controller is further adapted to receive an alert signal from the patient support apparatus via the first transceiver and to change one of a normally open state or a normally closed state of a second pin of the multi-pin connection in response to receipt of the alert signal, wherein the second pin is different from the particular pin.

4. The headwall interface of claim 3 wherein the alert signal indicates a patient has exited from the patient support apparatus.

5. The headwall interface of claim 1 wherein the first transceiver is a Bluetooth transceiver.

6. The headwall interface of claim 5 further comprising an infrared transmitter.

7. The headwall interface of claim 1 wherein the controller is adapted to forward a unique identifier uniquely identifying the headwall interface to the patient support apparatus using the first transceiver.

8. The headwall interface of claim 1 wherein the controller is adapted to receive a unique identifier uniquely identifying the patient support apparatus from the patient support apparatus using the first transceiver.

9. The headwall interface of claim 1 wherein the controller is further adapted to use a first unique identifier uniquely identifying the patient support apparatus and a second unique identifier uniquely identifying the headwall interface to establish the communication link between the headwall interface and the patient support apparatus.

10. A headwall interface adapted to be mounted to a wall of a healthcare facility, the headwall interface comprising:

a first transceiver adapted to wirelessly communicate with a second transceiver positioned onboard a patient support apparatus, the first transceiver adapted to receive patient audio signals of a patient's voice transmitted from the second transceiver onboard the patient support apparatus;

a communication cable having a plug adapted to plug into a connector mounted on the wall, the plug and connector forming a multi-pin connection when the plug is inserted into the connector;

a light; and a controller adapted to route the patient audio signals to a particular pin of the multi-pin connection, the controller further adapted to illuminate the light in a first manner when a communication link is established between the first and second transceivers, and to illuminate the light in a second and different manner when no communication link is established between the first and second transceivers.

11. The headwall interface of claim 10 wherein the headwall interface is adapted to receive electrical power directly from an AC mains line without the need for a power cable to be plugged into an AC power outlet.

12. The headwall interface of claim 10 wherein the controller is further adapted to receive nurse audio signals from the communication cable and to transmit the nurse audio signals to the patient support apparatus using the first transceiver.

13. The headwall interface of claim 10 wherein the controller is further adapted to receive an alert signal from the patient support apparatus via the first transceiver and to change one of a normally open state or a normally closed state of a second pin of the multi-pin connection in response to receipt of the alert signal, wherein the second pin is different from the particular pin.

14. The headwall interface of claim 13 wherein the alert signal indicates a patient has exited from the patient support apparatus.

15. The headwall interface of claim 10 wherein the first transceiver is a Bluetooth transceiver.

16. The headwall interface of claim 10 wherein the controller is in communication with an indicator adapted to illuminate a graphic in a first manner when the communication link is established between the first and second transceivers, and to illuminate the graphic in a second and different manner when no communication link is established between the first and second transceivers.

17. The headwall interface of claim 15 further comprising an infrared transmitter.

18. The headwall interface of claim 10 wherein the controller is further adapted to receive a first unique identifier uniquely identifying the patient support apparatus from the patient support apparatus, to send a second unique identifier uniquely identifying the headwall interface to the patient support apparatus, and to use the first and second unique identifiers to establish the communication link between the headwall interface and the patient support apparatus.

* * * * *